(12) United States Patent
Kober et al.

(10) Patent No.: US 12,428,895 B2
(45) Date of Patent: Sep. 30, 2025

(54) POWER-OPERATED RETRACTABLE CLOSURE PANEL FOR TRUCK BED

(71) Applicant: MAGNA CLOSURES INC., Newmarket (CA)

(72) Inventors: Tobias Kober, Bietigheim-Bissingen (DE); Mariusz Gierak, Bietigheim-Bissingen (DE); Marcus Papendorf, Bietigheim-Bissingen (DE); Gernot Bruder, Bietigheim-Bissingen (DE); Jens Anders, Bietigheim-Bissingen (DE); Metodi Kostadinov, Bietigheim-Bissingen (DE); Frank Bertz, Bietigheim-Bissingen (DE)

(73) Assignee: MAGNA CLOSURES INC., Newmarket (CA)

( * ) Notice: Subject to any disclaimer, the term of this patent is extended or adjusted under 35 U.S.C. 154(b) by 510 days.

(21) Appl. No.: 17/884,087

(22) Filed: Aug. 9, 2022

(65) Prior Publication Data
US 2023/0053274 A1 Feb. 16, 2023

Related U.S. Application Data

(60) Provisional application No. 63/231,892, filed on Aug. 11, 2021.

(51) Int. Cl.
*E05F 15/643* (2015.01)
*B60J 7/08* (2006.01)
*E05D 15/06* (2006.01)

(52) U.S. Cl.
CPC ............ *E05F 15/643* (2015.01); *B60J 7/085* (2013.01); *E05D 15/0621* (2013.01);
(Continued)

(58) Field of Classification Search
CPC .......... E05F 15/643; B60J 7/085; B60J 7/068; E05D 15/0621; E05D 15/12;
(Continued)

(56) References Cited

U.S. PATENT DOCUMENTS

| 1,578,641 | A | * | 3/1926 | Bywater | ................... | B60J 7/085 296/147 |
|---|---|---|---|---|---|---|
| 3,169,792 | A | | 2/1965 | Viquez | | |

(Continued)

FOREIGN PATENT DOCUMENTS

| CA | 2123616 A1 | 11/1995 |
|---|---|---|
| CA | 2123617 C | 1/1998 |

(Continued)

OTHER PUBLICATIONS

DE 102005049584 (Year: 2007).*
WO 9002056 (Year: 1990).*

*Primary Examiner* — Patricia L Engle
(74) *Attorney, Agent, or Firm* — Dickinson Wright PLLC

(57) ABSTRACT

A closure system for a motor vehicle cargo bed includes a closure panel having a plurality of slats moveable between a deployed position and a retracted position, with each adjacent pair of the slats being pivotably connected to one another by a hinge unit for pivotal movement of the adjacent slats about a hinge axis. First and second guide track units are configured to be mounted to one side of the cargo bed to extend adjacent opposite side edge portions of the closure panel. A plurality of roller units, each having first and second rollers, are supported along the opposite side edge portions of the cover panel for rolling movement along the first and second guide track units, with each roller unit rolling about a roller axis that is coaxially aligned with one of the hinge axes.

20 Claims, 36 Drawing Sheets

(52) U.S. Cl.
CPC ..... *E05Y 2201/10* (2013.01); *E05Y 2201/434* (2013.01); *E05Y 2201/656* (2013.01); *E05Y 2201/668* (2013.01); *E05Y 2201/684* (2013.01); *E05Y 2201/688* (2013.01); *E05Y 2400/41* (2013.01); *E05Y 2900/53* (2013.01)

(58) Field of Classification Search
CPC ........... E05Y 2201/10; E05Y 2201/434; E05Y 2201/656; E05Y 2201/668; E05Y 2201/684; E05Y 2201/688; E05Y 2400/41; E05Y 2900/53
See application file for complete search history.

(56) References Cited

U.S. PATENT DOCUMENTS

| | | | |
|---|---|---|---|
| 4,210,361 A * | 7/1980 | Marvin | B60J 7/068 296/100.09 |
| 4,458,937 A | 7/1984 | Beckmann et al. | |
| 4,506,870 A | 3/1985 | Pen | |
| 4,717,196 A | 1/1988 | Adams | |
| 4,786,099 A | 11/1988 | Mount | |
| 4,889,381 A * | 12/1989 | Tamblyn | B60J 7/068 296/100.09 |
| 5,040,843 A * | 8/1991 | Russell | E06B 9/581 296/100.09 |
| 5,251,950 A | 10/1993 | Bernardo | |
| 5,330,246 A | 7/1994 | Bernardo | |
| 5,350,213 A | 9/1994 | Bernardo | |
| 5,448,855 A * | 9/1995 | Sjoholm | E05D 15/0621 49/125 |
| 5,722,714 A | 3/1998 | Vallerand | |
| 5,895,086 A | 4/1999 | Carico | |
| 6,113,176 A * | 9/2000 | Bernardo | B60J 7/041 296/100.09 |
| 6,321,819 B1 | 11/2001 | Copp et al. | |
| 6,340,191 B1 | 1/2002 | Brady | |
| 6,478,355 B1 | 11/2002 | Van Eden et al. | |
| 6,499,791 B2 | 12/2002 | Wheatley | |
| 6,543,834 B2 | 4/2003 | Sisson | |
| 6,543,836 B1 | 4/2003 | Wheatley | |
| 6,550,849 B2 | 4/2003 | Dosdall | |
| 6,588,825 B1 | 7/2003 | Wheatley | |
| 6,619,719 B1 | 9/2003 | Wheatley | |
| 6,641,201 B1 | 11/2003 | Pietryga et al. | |
| 6,688,668 B2 | 2/2004 | Stevens et al. | |
| 6,712,418 B1 | 3/2004 | Lathers | |
| 6,783,169 B1 | 8/2004 | Marx et al. | |
| 6,848,734 B1 | 2/2005 | Mulvaney | |
| 6,893,073 B2 | 5/2005 | Wheatley | |
| 6,896,313 B2 | 5/2005 | Mack et al. | |
| 7,048,277 B1 | 5/2006 | Schmeichel | |
| 7,083,219 B1 | 8/2006 | Gregory | |
| 7,090,274 B1 | 8/2006 | Khan et al. | |
| 7,093,881 B2 | 8/2006 | Rusu | |
| 7,147,265 B1 | 12/2006 | Schmeichel | |
| 7,165,803 B2 | 1/2007 | Malmberg et al. | |
| 7,188,888 B2 | 3/2007 | Wheatley et al. | |
| 7,226,108 B2 | 6/2007 | Altman | |
| 7,243,965 B2 | 7/2007 | King et al. | |
| 7,252,322 B2 | 8/2007 | Rusu | |
| 7,264,297 B2 | 9/2007 | Boulard et al. | |
| 7,316,445 B2 | 1/2008 | Sugimoto | |
| 7,334,830 B2 | 2/2008 | Weldy | |
| 7,384,090 B1 | 6/2008 | Weldy | |
| 7,429,070 B2 | 9/2008 | Neubrand | |
| 7,484,788 B2 | 2/2009 | Calder et al. | |
| 7,530,621 B1 | 5/2009 | Curts | |
| 7,604,282 B2 | 10/2009 | Spencer et al. | |
| 7,607,714 B2 | 10/2009 | Wheatley | |
| 7,748,767 B2 | 7/2010 | Terhaar et al. | |
| 7,905,536 B2 | 3/2011 | Yue | |
| 7,913,965 B2 | 3/2011 | Boulard | |
| 7,946,643 B2 | 5/2011 | Getschel et al. | |
| 7,954,876 B2 | 6/2011 | Kosinski | |
| 7,954,881 B2 | 6/2011 | Berg | |
| 8,029,029 B2 | 10/2011 | Terhaar et al. | |
| 8,075,035 B1 | 12/2011 | Sullivan | |
| 8,128,149 B1 | 3/2012 | Wolf et al. | |
| 8,146,981 B2 | 4/2012 | Huotari et al. | |
| 8,186,740 B2 | 5/2012 | Huotari et al. | |
| 8,205,928 B2 | 6/2012 | Steffens et al. | |
| 8,322,779 B2 | 12/2012 | Kramer | |
| 8,336,946 B2 | 12/2012 | Schrader et al. | |
| 8,348,328 B2 * | 1/2013 | Walser | B60J 7/141 296/100.09 |
| 8,511,736 B2 | 8/2013 | Williamson et al. | |
| 8,523,266 B2 | 9/2013 | Yue | |
| 8,540,302 B2 | 9/2013 | Lenz, Jr. | |
| 8,573,678 B2 | 11/2013 | Yue | |
| 8,585,120 B2 | 11/2013 | Rusher et al. | |
| 8,596,708 B2 | 12/2013 | Schmeichel | |
| 8,632,114 B2 | 1/2014 | Yue | |
| 8,641,124 B1 | 2/2014 | Yue | |
| 8,814,249 B2 | 8/2014 | Rossi | |
| 8,960,765 B2 | 2/2015 | Facchinello et al. | |
| 9,150,259 B2 | 10/2015 | Jutila et al. | |
| 9,163,667 B2 | 10/2015 | Blase et al. | |
| 9,428,038 B2 | 8/2016 | Yue | |
| 9,527,373 B2 | 12/2016 | Yue | |
| 9,597,995 B1 | 3/2017 | Weltikol et al. | |
| 9,599,157 B2 | 3/2017 | Selzer | |
| 9,738,143 B2 | 8/2017 | Weltikol et al. | |
| 9,827,838 B2 | 11/2017 | Hannan et al. | |
| 9,840,135 B2 | 12/2017 | Rusher et al. | |
| 9,849,765 B2 | 12/2017 | Carlson | |
| 9,895,964 B1 | 2/2018 | Hickey et al. | |
| 10,011,309 B1 | 7/2018 | Suzuka | |
| 10,053,160 B2 | 8/2018 | Erlandson | |
| 10,081,235 B2 | 9/2018 | Freitas et al. | |
| 10,093,159 B1 | 10/2018 | Zichettello et al. | |
| 10,099,730 B1 | 10/2018 | Williams et al. | |
| 10,112,464 B2 | 10/2018 | Koengeter et al. | |
| 10,118,471 B1 | 11/2018 | White et al. | |
| 10,131,215 B2 | 11/2018 | Zichettello et al. | |
| 10,173,506 B2 | 1/2019 | Nania | |
| 10,196,100 B2 | 2/2019 | Yen et al. | |
| 10,322,624 B2 | 6/2019 | Facchinello et al. | |
| 10,399,615 B2 | 9/2019 | Williams et al. | |
| 10,406,897 B2 | 9/2019 | Spencer et al. | |
| 10,414,257 B2 | 9/2019 | Facchinello | |
| 10,427,512 B2 | 10/2019 | Zichettello et al. | |
| 10,427,730 B2 | 10/2019 | Williams et al. | |
| 10,526,019 B2 | 1/2020 | Jhant et al. | |
| 10,538,150 B2 | 1/2020 | Zichettello et al. | |
| 10,562,384 B2 | 2/2020 | Rohr et al. | |
| 10,589,803 B2 | 3/2020 | Povinelli et al. | |
| 10,648,205 B2 | 5/2020 | Spencer | |
| 10,654,346 B2 | 5/2020 | Copp et al. | |
| 10,668,794 B2 | 6/2020 | Xu | |
| 10,737,563 B2 | 8/2020 | Carter et al. | |
| 10,746,209 B2 | 8/2020 | Voegele et al. | |
| 10,800,234 B2 * | 10/2020 | Dylewski, II | B60J 7/198 |
| 10,862,290 B2 | 12/2020 | Hermey et al. | |
| 11,014,435 B1 | 5/2021 | Voegele et al. | |
| 11,034,221 B2 * | 6/2021 | Yen | B60J 7/067 |
| 11,235,648 B2 | 2/2022 | Oliver et al. | |
| 11,267,321 B2 | 3/2022 | Jocz | |
| 11,312,428 B2 | 4/2022 | Bossons | |
| 11,345,285 B2 | 5/2022 | Joshi | |
| 11,565,645 B2 | 1/2023 | Salter et al. | |
| 11,885,177 B2 | 1/2024 | Fowler et al. | |
| 2002/0008396 A1 | 1/2002 | De Gaillard | |
| 2002/0113456 A1 | 8/2002 | Schall et al. | |
| 2002/0145299 A1 | 10/2002 | Henderson | |
| 2003/0168879 A1 | 9/2003 | Grudek | |
| 2005/0057073 A1 | 3/2005 | Hunt | |
| 2005/0099033 A1 | 5/2005 | Chverchko et al. | |
| 2008/0030049 A1 | 2/2008 | Cooper | |
| 2008/0272627 A1 | 11/2008 | Joab | |
| 2009/0039675 A1 | 2/2009 | King et al. | |
| 2009/0102227 A1 | 4/2009 | Herndon | |
| 2010/0140973 A1 * | 6/2010 | Duncan | B60J 7/141 296/100.09 |

(56) References Cited

U.S. PATENT DOCUMENTS

| | | | |
|---|---|---|---|
| 2010/0320887 A1* | 12/2010 | Bortoluzzi | E05D 15/0652 24/303 |
| 2011/0221227 A1 | 9/2011 | Kayser | |
| 2012/0292937 A1 | 11/2012 | Hobrecht et al. | |
| 2015/0239388 A1 | 8/2015 | Potter | |
| 2018/0043759 A1* | 2/2018 | Rohr | B60J 7/068 |
| 2018/0118002 A1* | 5/2018 | Koengeter | B60P 7/02 |
| 2018/0126833 A1 | 5/2018 | Hannan et al. | |
| 2019/0054809 A1* | 2/2019 | Bernardo | B60J 7/085 |
| 2019/0128042 A1 | 5/2019 | Junod | |
| 2019/0145462 A1 | 5/2019 | Jansa et al. | |
| 2020/0101823 A1 | 4/2020 | Bernardo | |
| 2020/0130483 A1 | 4/2020 | Vickery | |
| 2020/0171928 A1* | 6/2020 | Rawnsley | B60J 7/067 |
| 2020/0269667 A1 | 8/2020 | Fargo et al. | |
| 2021/0016642 A1 | 1/2021 | Bernardo et al. | |
| 2021/0107343 A1* | 4/2021 | Rørvig | B60J 7/068 |
| 2021/0114444 A1* | 4/2021 | Voegele | B60J 7/04 |
| 2021/0213813 A1* | 7/2021 | Fowler | B60J 7/085 |
| 2022/0032752 A1* | 2/2022 | Carter | B60J 7/068 |
| 2022/0144056 A1* | 5/2022 | Voetmann | B60J 7/041 |
| 2022/0348142 A1 | 11/2022 | Scaringe et al. | |
| 2023/0114568 A1* | 4/2023 | Carter | B60J 7/068 296/100.05 |
| 2025/0050715 A1* | 2/2025 | Becker | B60J 7/068 |

FOREIGN PATENT DOCUMENTS

| | | | | |
|---|---|---|---|---|
| CA | 2913746 A1 | 5/2017 | | |
| CA | 3025599 A1 | 7/2019 | | |
| CA | 3036149 A1 | 9/2019 | | |
| CA | 3004864 C | 8/2020 | | |
| CN | 101181885 B | 12/2007 | | |
| CN | 201128390 Y | 10/2008 | | |
| CN | 101326337 A | 12/2008 | | |
| CN | 202703387 U | 1/2013 | | |
| CN | 206954085 U | 2/2018 | | |
| CN | 107801407 A | 3/2018 | | |
| CN | 110395096 A | 11/2019 | | |
| CN | 210911973 U | 7/2020 | | |
| CN | 211969140 U | 11/2020 | | |
| CN | 112219007 A | 1/2021 | | |
| DE | 10233747 A1 | 2/2004 | | |
| DE | 102005049584 A1 * | 5/2007 | | E06B 9/08 |
| EP | 3177483 A1 | 6/2017 | | |
| EP | 3119624 A1 | 10/2020 | | |
| EP | 4269143 A2 | 1/2023 | | |
| EP | 4134281 A1 | 2/2023 | | |
| JP | 3249775 B2 | 1/2002 | | |
| JP | 2006160097 A | 6/2006 | | |
| JP | 2009113511 A | 11/2007 | | |
| KR | 200318671 Y1 | 7/2003 | | |
| NZ | 755798 A | 7/2018 | | |
| WO | WO-9002056 A * | 3/1990 | | B60J 7/068 |
| WO | 1998032943 A1 | 7/1998 | | |
| WO | 2014015574 A1 | 1/2014 | | |
| WO | 2019130218 A1 | 7/2019 | | |
| WO | 2019227133 A1 | 12/2019 | | |
| WO | 2019227134 A1 | 12/2019 | | |
| WO | 2019227135 A1 | 12/2019 | | |
| WO | 2019227159 A1 | 12/2019 | | |
| WO | 2020229214 A1 | 11/2020 | | |
| WO | 2020229401 A1 | 11/2020 | | |
| WO | 2020229450 A1 | 11/2020 | | |
| WO | 2020234073 A1 | 11/2020 | | |
| WO | 2021037882 A1 | 3/2021 | | |
| WO | 2021102174 A1 | 5/2021 | | |

\* cited by examiner

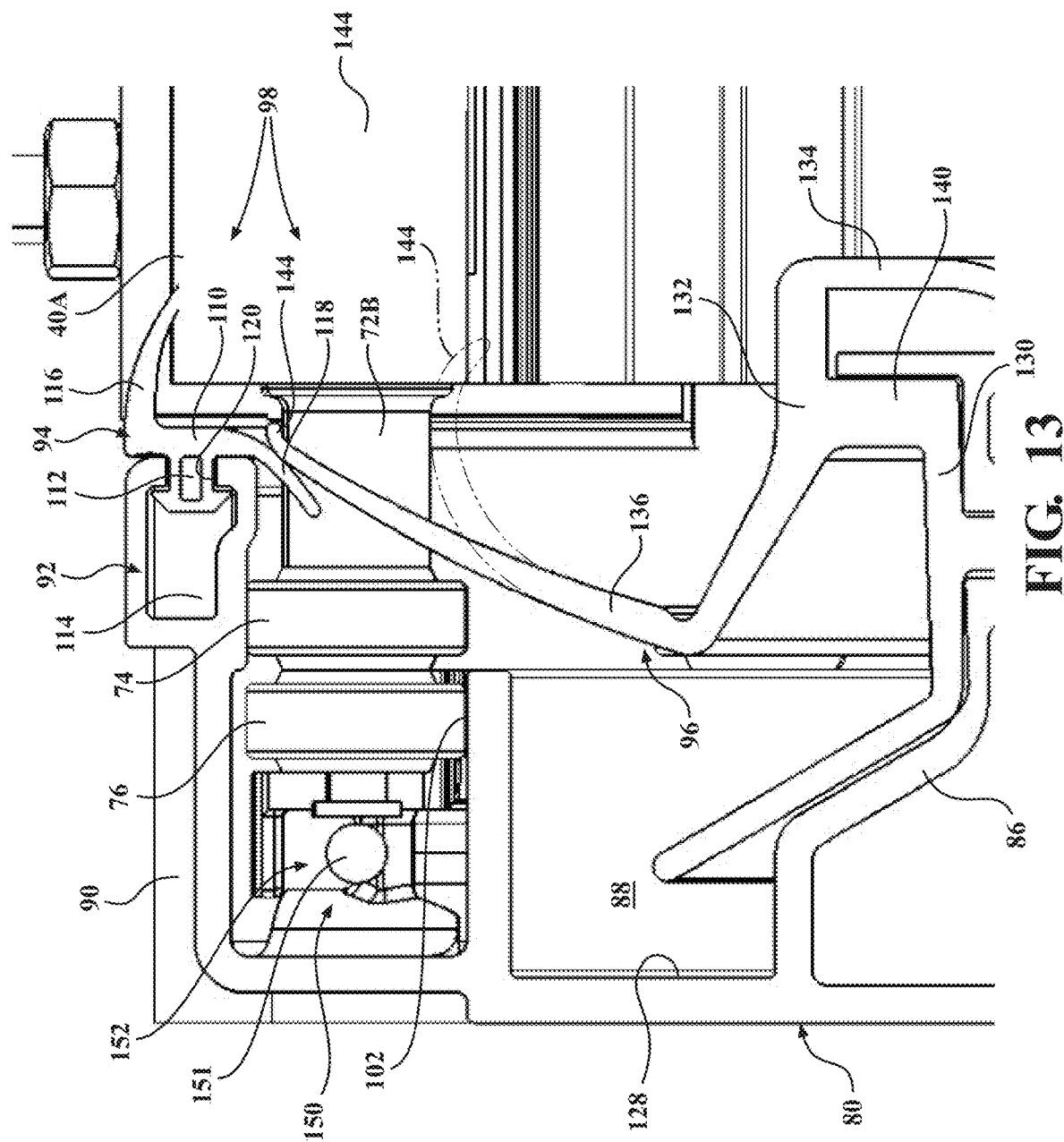

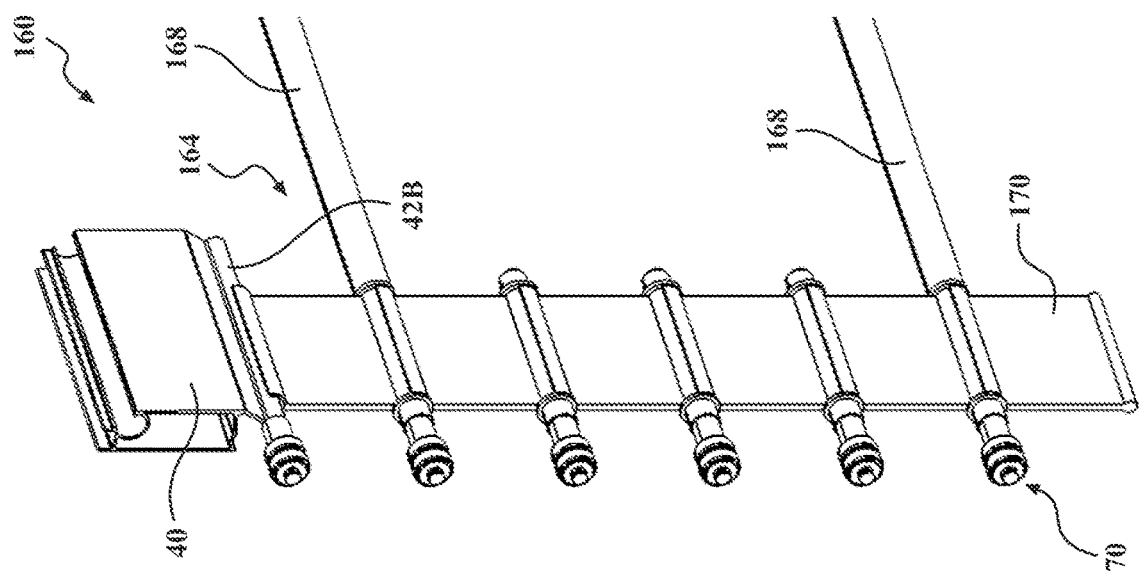
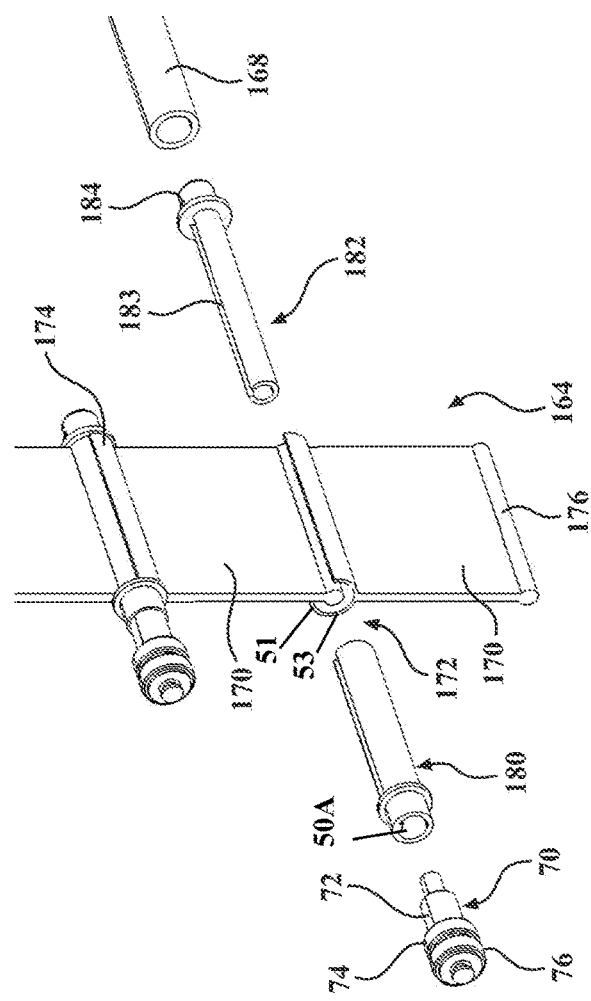
FIG. 16A
FIG. 16B

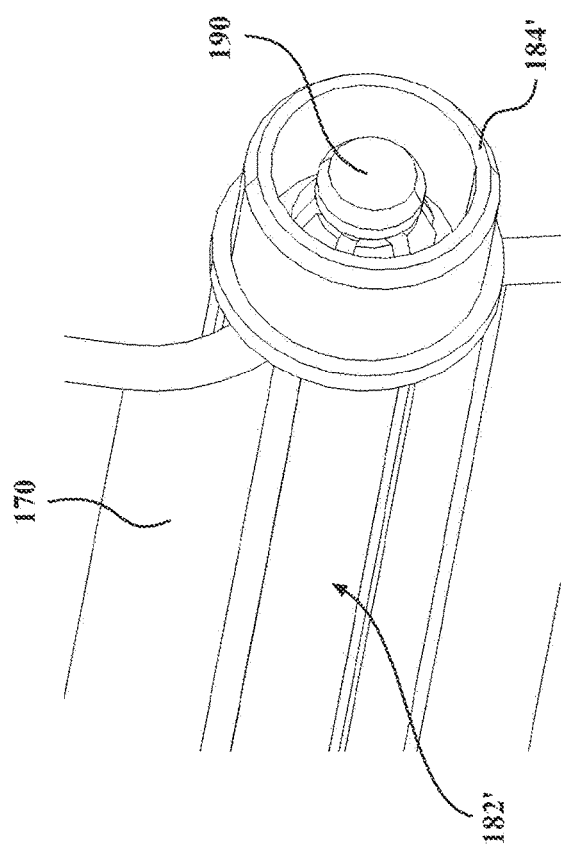
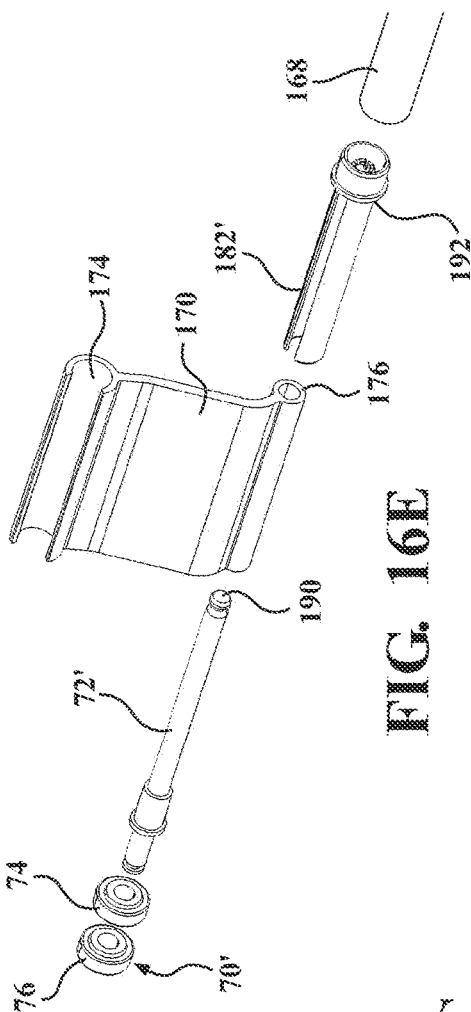
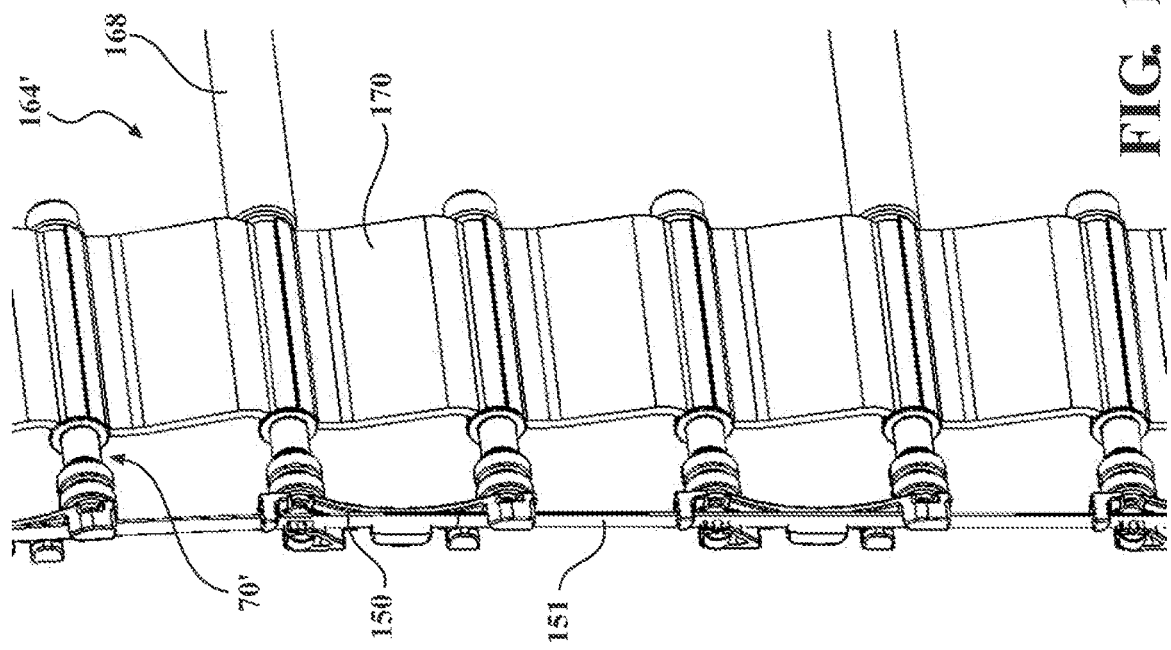

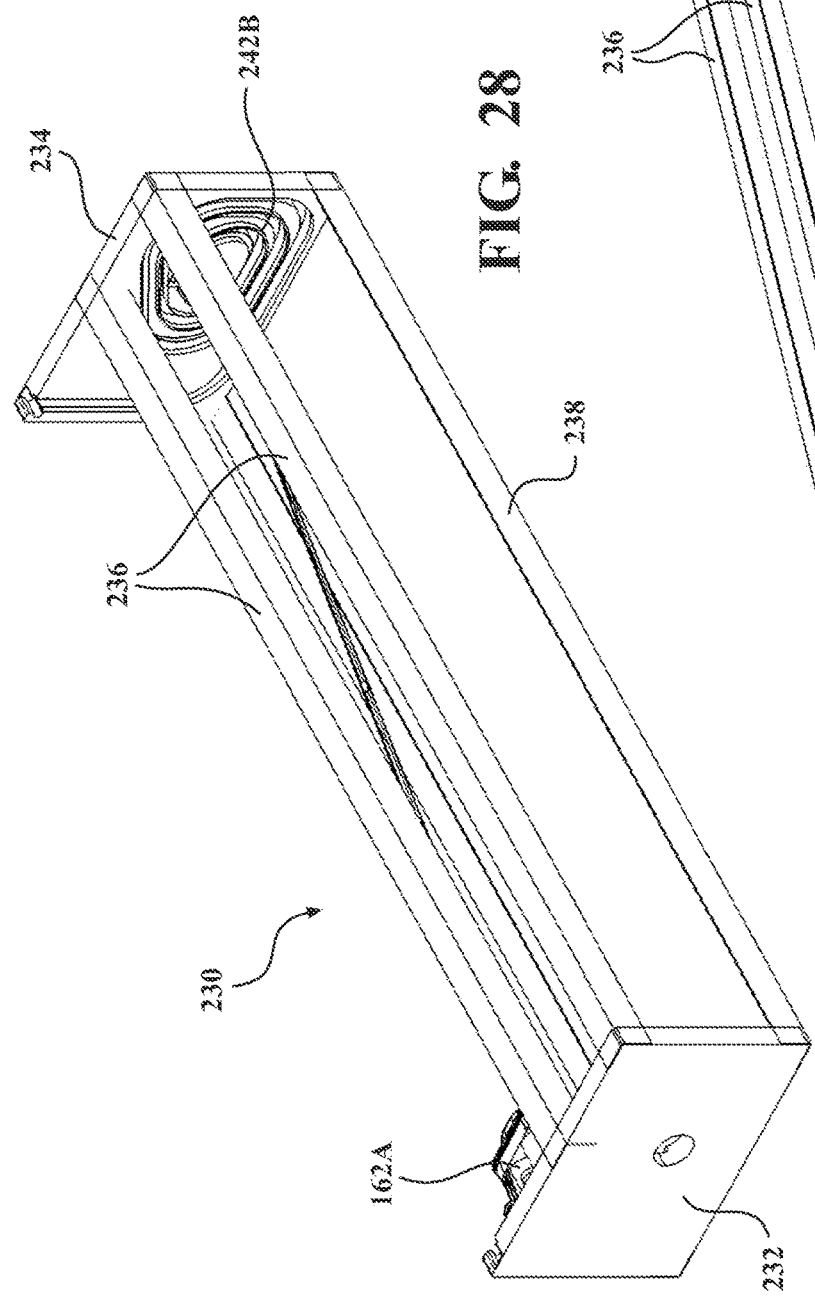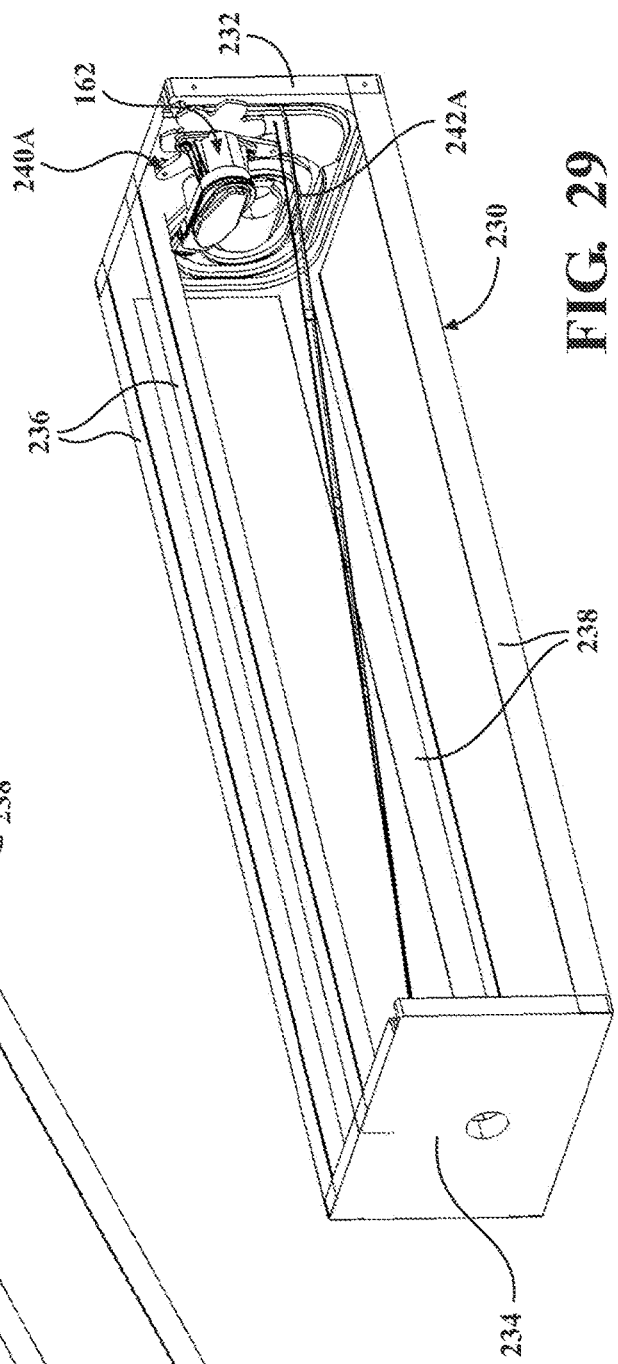

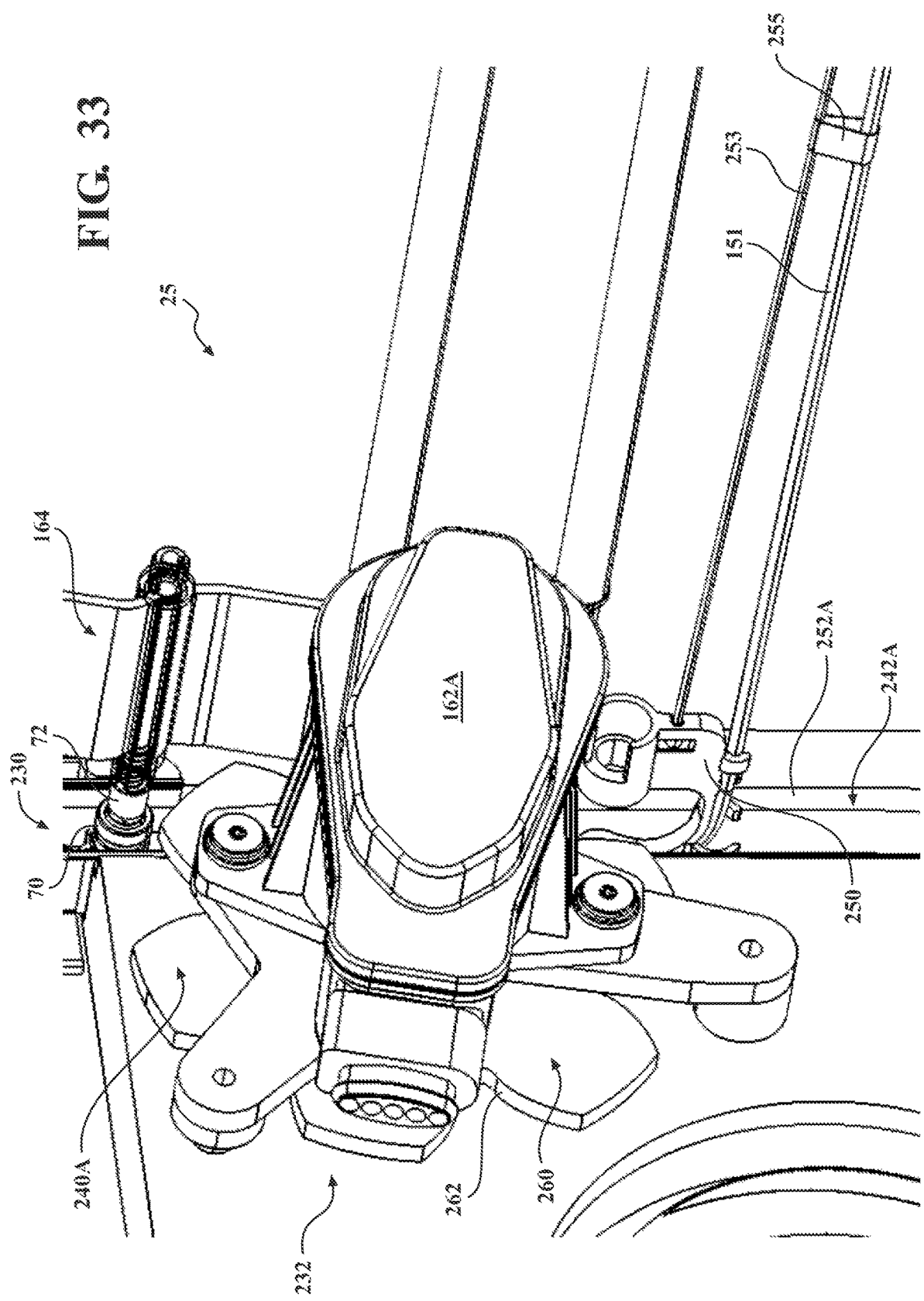

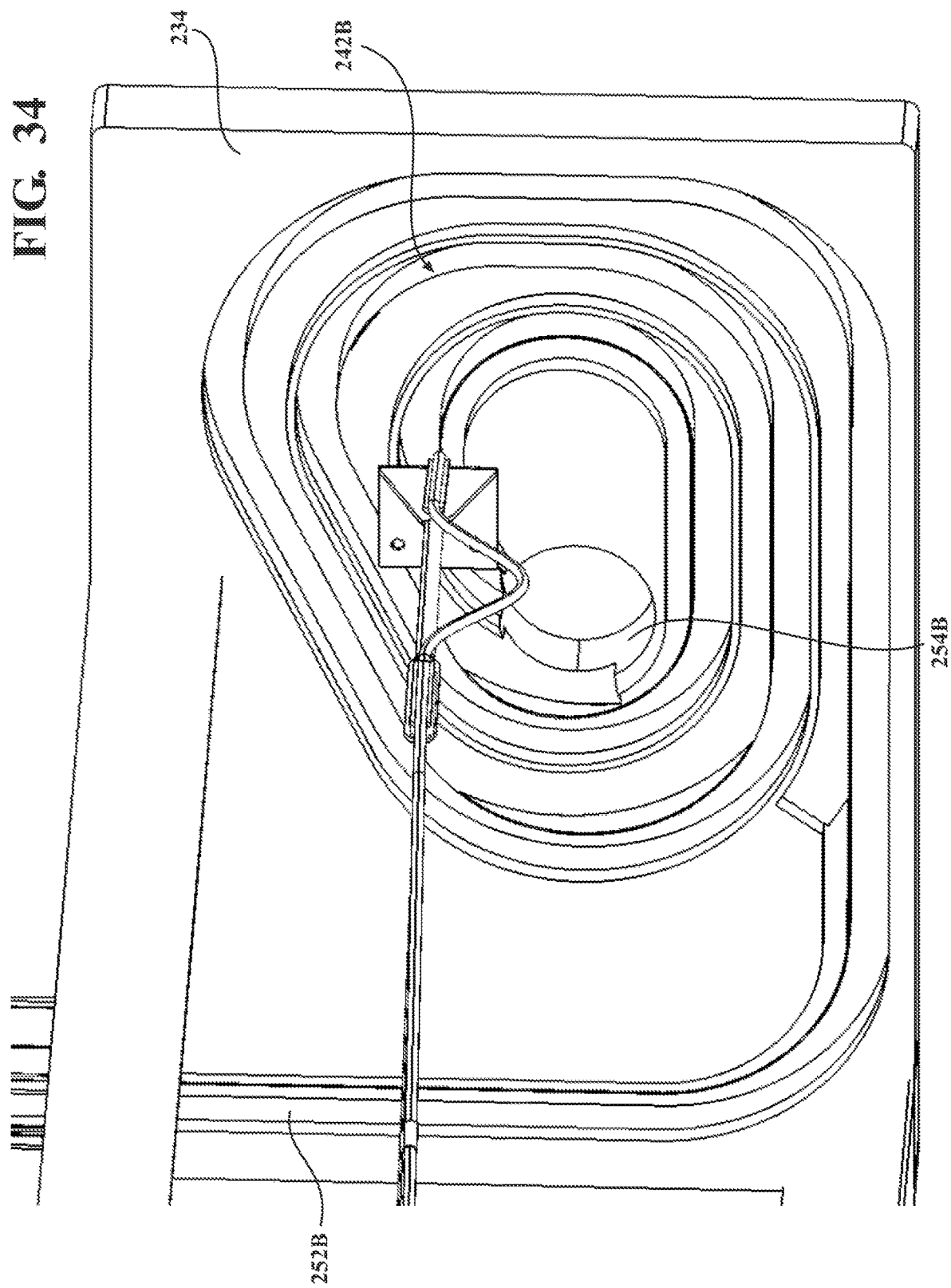

POWER-OPERATED RETRACTABLE CLOSURE PANEL FOR TRUCK BED

CROSS-REFERENCE TO RELATED APPLICATION

This application claims the benefit of U.S. Provisional Application Ser. No. 63/231,892, filed Aug. 11, 2021, which is incorporated herein by reference in its entirety.

FIELD

The present disclosure relates generally to power-operated closure systems for moving a closure panel between first and second positions relative to a body portion of a motor vehicle. More particularly, the present disclosure is directed to such a power-operated closure system configured to move a multi-panel tonneau cover between retracted and deployed positions relative to the cargo bed of a pickup truck.

BACKGROUND

This section provides background information which is not necessarily prior art to the inventive concepts embodied in the present disclosure.

Continued increases in technology, driven by consumer demand for enhanced comfort and convenience features, has resulted in development of advanced closure systems for integration into motor vehicles. For example, some vehicles, such as pickup trucks, are now being equipped with closure panels, commonly referred to as "tonneau" covers, which are configured to enclose the cargo bed. A number of different types of both "hard" and "soft" tonneau covers are currently available. Hard tonneau covers are typically hinged to the cargo bed adjacent to the cab portion of the pickup truck and are configured to pivot between opened and closed positions. Alternatively, soft tonneau covers typically include a plurality of interconnected (i.e. hinged) panels configured to move between a retracted position providing access to the cargo bed and a deployed position for enclosing the cargo bed. In the retracted position, the interconnected panels are stored in a folded or rolled configuration to provide a compact storage arrangement.

One of the above-mentioned enhanced convenience features relates to power-operated movement of the tonneau cover. However, such power-operated closure systems, particularly those directed to soft tonneau covers, require that additional structure and complexity be integrated into the cargo bed to accommodate a motor-driven power unit and guide and sealing systems for the retractable tonneau cover. In view of the above, a recognized need exists directed toward advancing the technology and providing enhanced power-operated closure systems that address and overcome at least some of the known shortcomings associated with conventional tonneau cover arrangements.

SUMMARY

This section provides a general summary of various aspects, features and structural embodiments provided by or associated with one or more of the inventive concepts hereinafter disclosed in accordance with the present disclosure. However, this section is not intended to be a comprehensive and exhaustive summation and/or limit the interpretation and scope of protection afforded by the claims.

In an aspect, this disclosure provides a power-operated closure system for moving a closure panel between retracted and deployed positions relative to a body portion of a motor vehicle.

In further defining this aspect, this disclosure provides a power-operated closure system having an electric drive unit configured to move a multi-panel tonneau cover between retracted and deployed positions relative to a cargo bed portion of a pickup truck.

An additional aspect of this disclosure is directed to providing the power-operated closure system with a guide and sealing arrangement configured to work in coordination with the moveable multi-panel tonneau cover and which specifically includes a roller and track arrangement providing an anti-rattle feature.

As another additional aspect of this disclosure, the power-operated closure system includes a chain linkage arrangement employed to interconnect the multi-panel tonneau cover to the electric drive unit.

In accordance with yet another aspect of this disclosure, the power-operated closure system is further equipped with a power-operated applique cover that is moveable between opened and closed positions relative to the electric drive unit.

This disclosure further defines another aspect directed to providing the power-operated closure system with a cable management arrangement operably disposed between the electric drive unit and the tonneau cover.

In accordance with these and other aspects, the closure system of the present disclosure is generally configured to include: a closure panel; a power-operated drive unit; a chain linkage mechanism interconnecting the closure panel to the drive unit; a guide track mechanism; a roller mechanism supporting the closure panel for movement relative to the guide track mechanism and providing an anti-rattle feature; a track sealing mechanism interacting with the guide track mechanism and the roller mechanism to provide an anti-intrusion feature; a furling mechanism associated with the drive unit to provide a compact storage arrangement for the closure panel; an applique cover assembly having a moveable applique cover and a power-operated actuator; and a control arrangement for controlling actuation of the drive unit to move the closure panel between retracted and deployed positions and for controlling actuation of the actuator to move the applique cover between closed and opened positions.

In accordance with the particular configuration noted above: the closure panel is a multi-panel tonneau cover having a plurality of slats pivotally interconnected via hinge units and sealed via slat seal units; the power-operated drive unit includes a storage box defining the furling mechanism and a pair of laterally-spaced electric motors; the chain linkage mechanism includes a pair of laterally-spaced chain link units each having a first end connected to a trailing end of the tonneau cover and a second end disposed within the furling mechanism; the guide track mechanism includes a pair of laterally-spaced guide track units; the roller mechanism includes a plurality of dual roller units operably mounted to edge portions of the tonneau cover and the chain link units and which are disposed within the guide track units; the track sealing mechanism includes upper and lower track seal units mounted to each of the laterally-spaced guide track units and which function to provide sealed engagement with the dual roller units during movement of the tonneau cover; and the furling mechanism includes a pair of laterally-spaced furling channels formed in the storage box and operable to accept the dual roller units on the chain link units and the tonneau cover to provide compact storage of the tonneau cover therein.

In accordance with another particular aspect of the disclosure, a closure system for a motor vehicle having a cargo bed is provided. The closure system includes a closure panel that extends along opposite side edges portions between opposite end portions. The closure panel is moveable between a deployed position and a retracted position. The closure panel has a plurality of slats, with adjacent pairs of the slats being pivotably connected to one another by at least one hinge unit to facilitate relative pivotal movement between the adjacent pairs of slats about a hinge axis. A guide track mechanism includes a driver-side guide track unit configured to be mounted to the cargo bed and to extend adjacent one of the opposite side edge portions of the closure panel, and a passenger-side guide track unit configured to be mounted to the cargo bed and to extend adjacent the other of the opposite side edge portions of the closure panel. A plurality of roller units are provide, with each of the roller units having an axle, at least one roller-supported by a roller support segment of the axle for rolling movement about a roller axis along the driver-side guide track unit and along the passenger-side guide track unit. A mounting segment is coupled to the at least one hinge unit, wherein the hinge axis and the roller axis are coaxially aligned.

In accordance with another aspect, the driver-side guide track unit and the passenger-side guide track unit each include a first roller surface and a second roller surface. The first roller is configured for rolling engagement with the first roller surface and the second roller is configured for rolling engagement with the second roller surface.

In accordance with another aspect, the first roller is spaced from the second roller surface and the second roller is spaced from the first roller surface, and thus, the first roller only makes rolling contact with the first roller surface, thereby avoiding any resistance, skidding, wear or frictional losses with the second rolling surface, while the second roller only makes rolling contact with the second roller surface, thereby avoiding any resistance, skidding, wear or frictional losses with the first rolling surface.

In accordance with another aspect, the first roller surface has a stepped portion forming a gap between a portion of the first roller surface overlying the second roller, thereby avoiding contact between the first roller surface and the second roller.

In accordance with another aspect, the first roller surface extends solely along one side of the roller axis and the second roller surface extends solely along a diametrically opposite side of the roller axis from the first roller surface, wherein the first and second roller surfaces are planar and parallel with one another.

In accordance with another aspect, the closure system further includes a first power-operated drive unit and a storage box including a furling mechanism configured to be mounted in the cargo bed; a chain linkage mechanism having a first portion connected to the closure panel and a second portion connected to the furling mechanism; and a control system for controlling actuation of the first power-operated drive unit to cause movement of the closure panel between the retracted position stored within the furling mechanism in the storage box and the deployed position enclosing the cargo bed.

In accordance with another aspect, the furling mechanism includes a circuitous furling channel formed in an end plate of the storage box and which is adapted to receive the chain linkage mechanism and the closure panel therein upon movement of the closure panel to its retracted position.

In accordance with another aspect, the closure system further includes a cable management arrangement including a cable connecting the closure panel and the chain linkage arrangement to the furling channel, and cable guide units connected to adjacent pairs of the axles of the roller units.

In accordance with another aspect, the closure system further includes an applique cover configured to be mounted to the cargo bed above the storage box in overlying relation therewith, and above a portion of the closure panel, wherein the applique cover is configured for movement between a closed position and an opened position.

In accordance with another aspect, the closure system further includes a second power-operated drive unit interconnected to the applique cover, wherein the control system controls and coordinates actuation of the first power-operated drive unit and the second power-operated drive unit to coordinate precise movement of the closure panel between its retracted and deployed positions and movement of the applique cover between its opened and closed positions.

In accordance with another aspect, the first power-operated drive unit and the second power-operated drive unit are mounted in the storage box, and thus, are kept out of direct sight and are protected against inadvertent exposure to damage.

In accordance with another aspect, the first power-operated drive unit includes a geartrain configured to drive a cog wheel in opposite first and second directions of rotation. The cog wheel has cog teeth sized to receive the axle of the roller units therebetween, such that rotation of cog wheel in the first direction drives roller units in a first direction, which in turn causes closure panel to be moved toward the retracted position, and such that rotation of cog wheel in the second direction drives roller units in a second direction, which in turn causes closure panel to be moved toward the deployed position.

In accordance with another aspect, the closure system further includes a plurality of slat seal units. Separate ones of the slat seal units extend between the adjacent pairs of the slats to provide a continuous sealed interface between the adjacent pairs of slats, thereby preventing the ingress of fluid into the cargo bed when the closure panel is in the deployed position.

In accordance with another aspect, each of the plurality of slat seal units have a first retention segment configured for attachment to one of the adjacent pairs of slats and a second retention segment configured for attachment to the other of the adjacent pairs of slats. A first sealing segment is connected to the first retention segment, a second sealing segment is connected to the second retention segment, and a flexible, looped web segment extends between the first sealing segment and the second sealing segment. The web segment allows the first sealing segment and the second sealing segment to move laterally toward and away from one another during movement of the cover panel between the deployed and retracted positions.

In accordance with another aspect, the first sealing segment and the second sealing segment each has a tubular wall extending lengthwise between the opposite driver-side and passenger-side guide track units.

In accordance with another aspect, the closure system further includes a track sealing arrangement arranged to provide sealed engagement with the driver-side and passenger-side guide track units to seal driver-side and passenger-side guide track units to maintain first and second rollers in a sealed environment.

In accordance with another aspect, the track sealing arrangement includes a pair of upper track seal units that extend longitudinally along the length of the driver-side and passenger-side guide track units, and a pair of lower track seal units that extend longitudinally along the length of the driver-side and passenger-side guide track units. Each of the upper track seal units has a slat seal lip and a track seal lip. The slat seal lip extends over and resiliently engages an outer surface of the plurality of slats to provide an external sealing function relative to the cover panel when the cover panel is in the deployed position. Each of the lower track seal units has a flapper seal lip including a tip end biased into sealed engagement against the track seal lip of the upper track seal units.

In accordance with another aspect, the track seal lip is configured to engage and ride over of the axles of the plurality of roller units.

In accordance with another aspect, each of the lower track seal units has a locator flange extending in an opposite direction from flapper seal lip to a terminal tip portion configured to engage an outer wall surface within internal storage space of the cargo bed.

In accordance with another aspect, the chain linkage mechanism has a first chain link unit and a second chain link unit, and a plurality of cross members interconnecting the first chain link unit and the second chain link unit. Each of the first and second chain link units has a first portion pivotably secured to a trailing end section of the cover panel and a second portion operably connected to the furling mechanism.

These and other aspects and areas of applicability will become apparent from the description provided herein. The description, nomenclature used, and specific examples in this summary are solely intended for purposes of illustration and are not intended to limit the scope of the present disclosure. The drawings that accompany the detailed description are described below.

DRAWINGS

The drawings described herein are for illustrative purposes only of selected non-limiting embodiments and not all possible or anticipated implementations thereof, and are not intended to limit the fair and reasonable scope of protection afforded the present disclosure. With this in mind, the drawings include:

Figure 12:
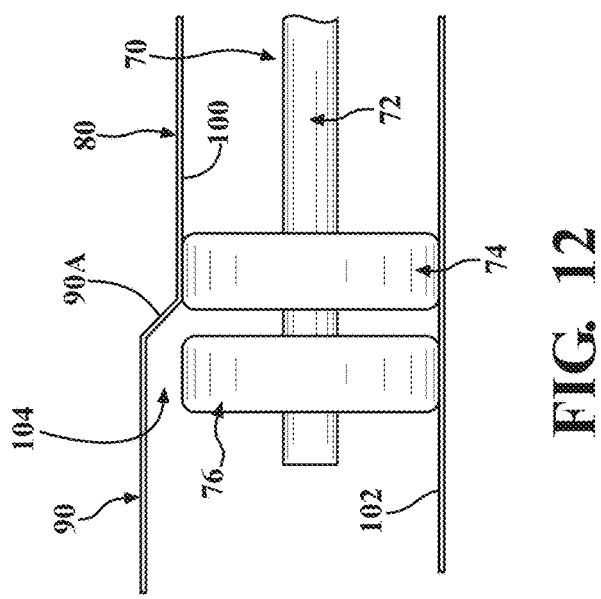
Figure 11:
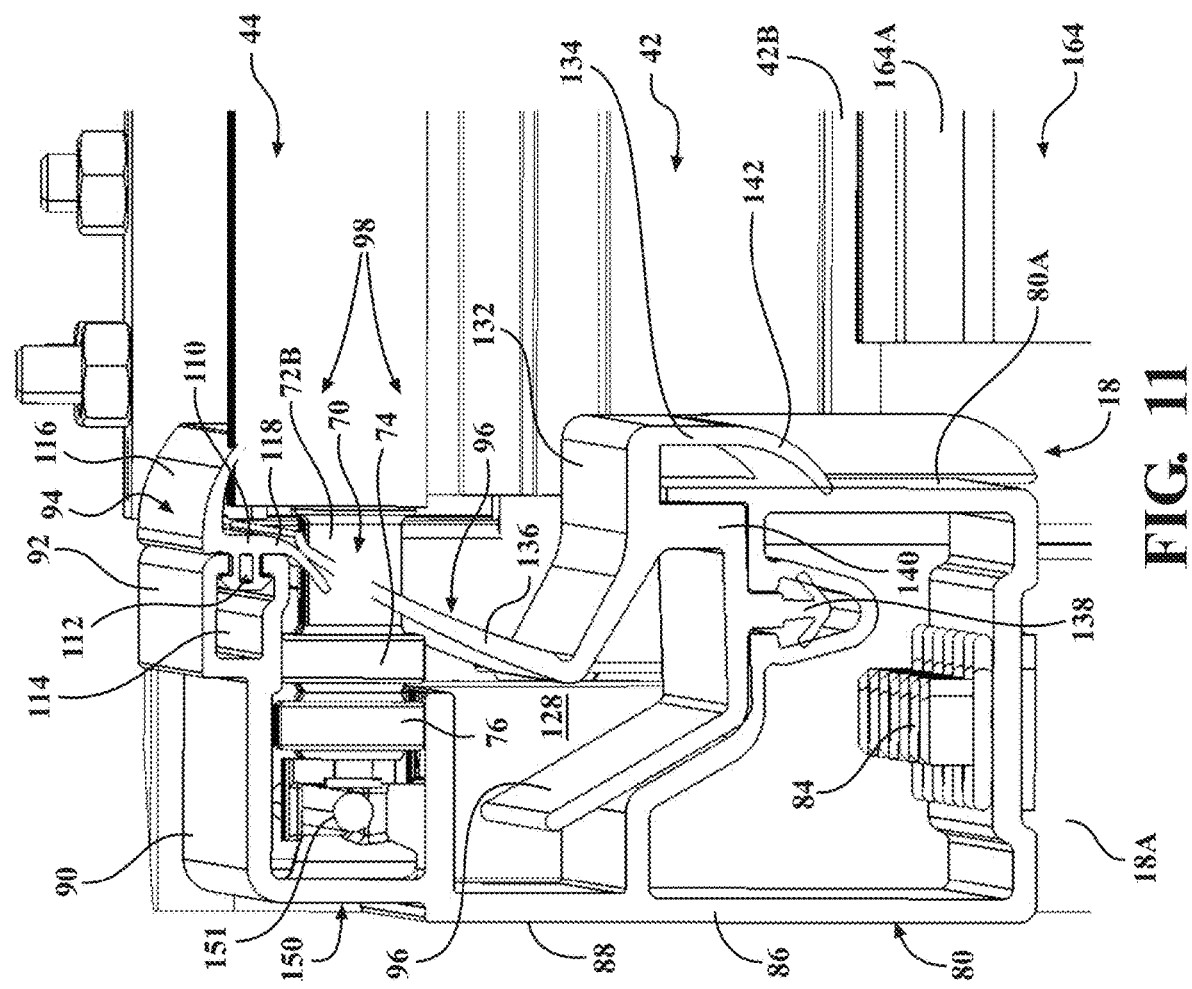
Figure 14:
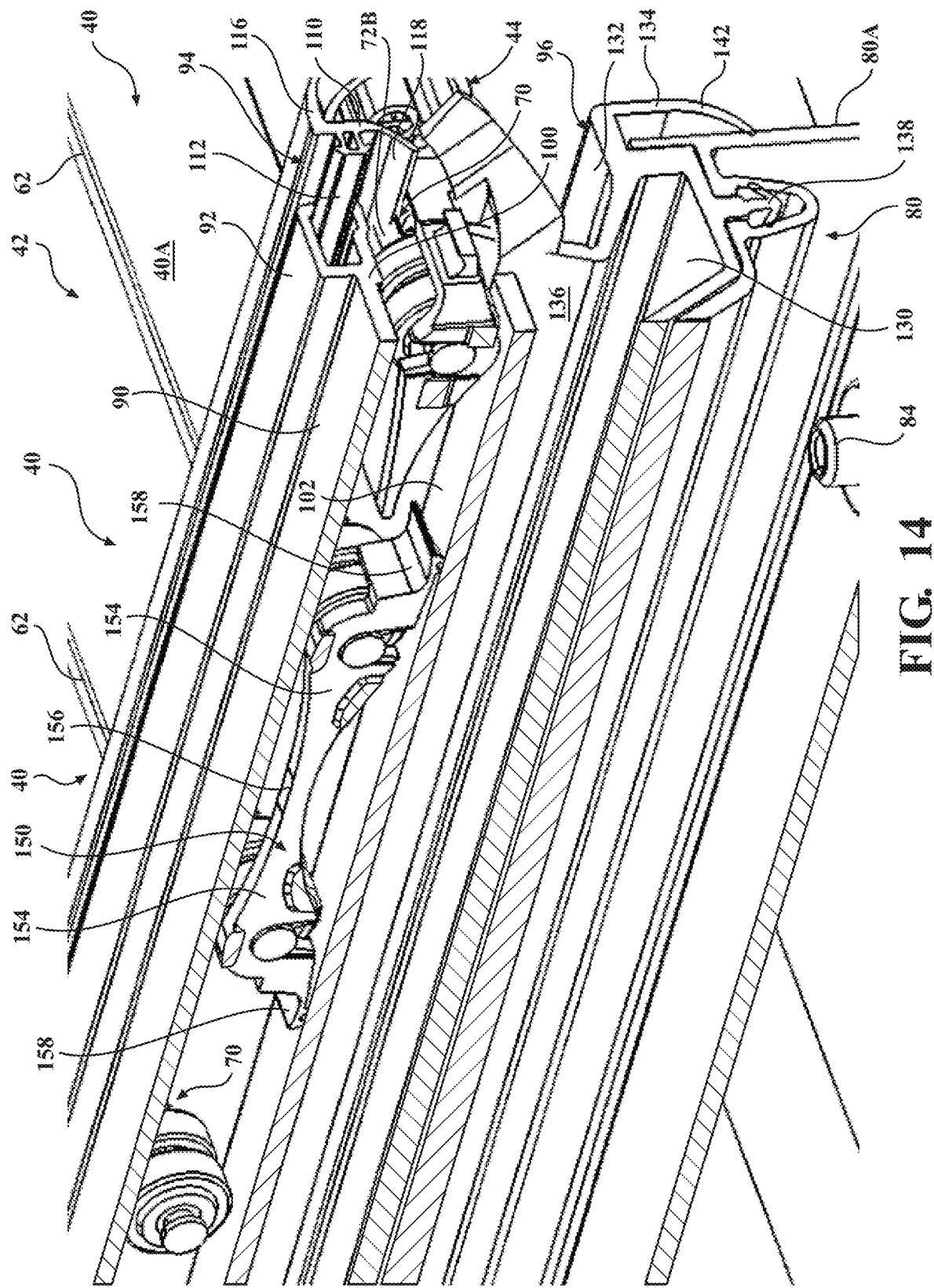
Figure 15:
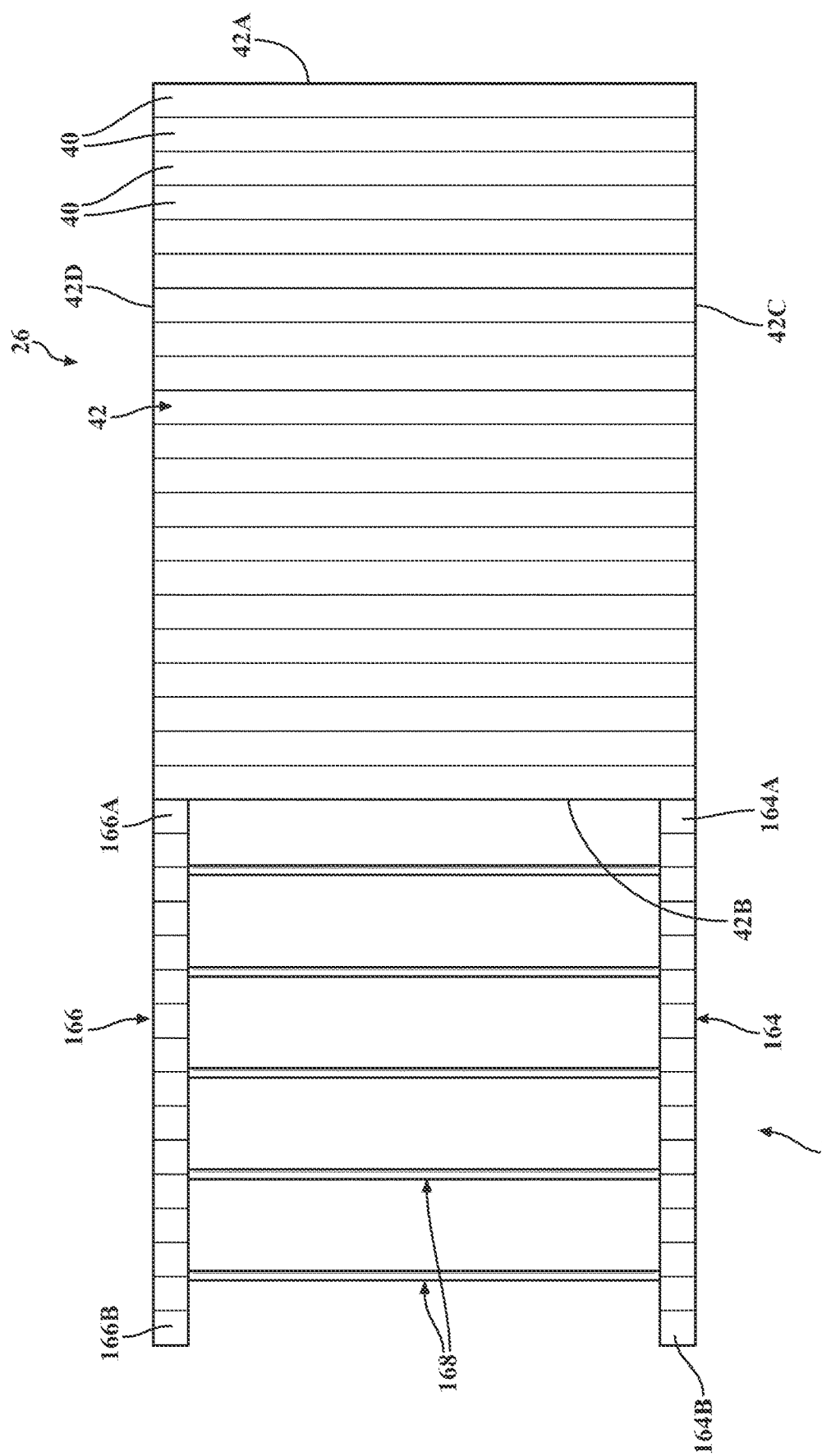
Figure 17:
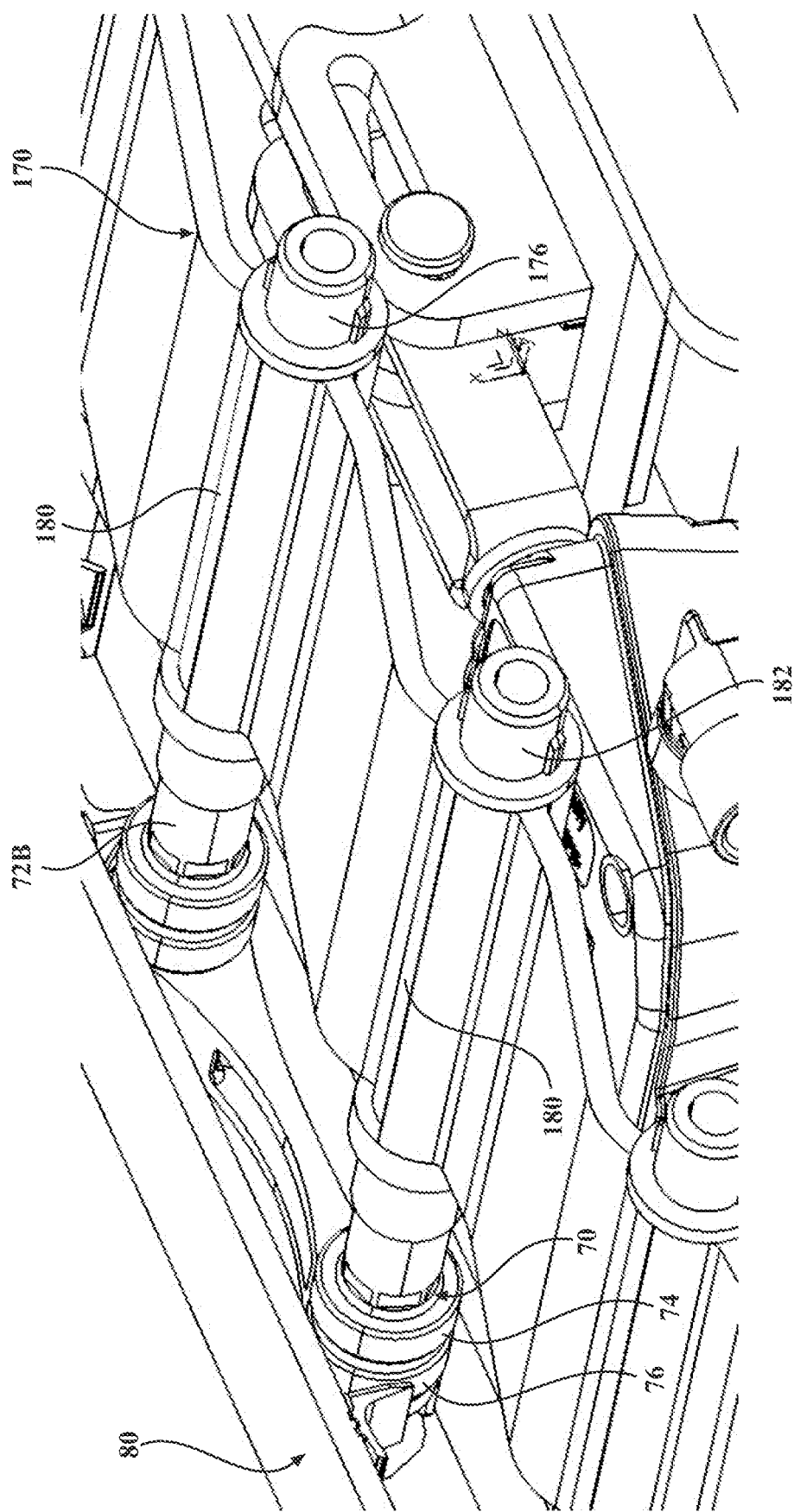
Figure 18:
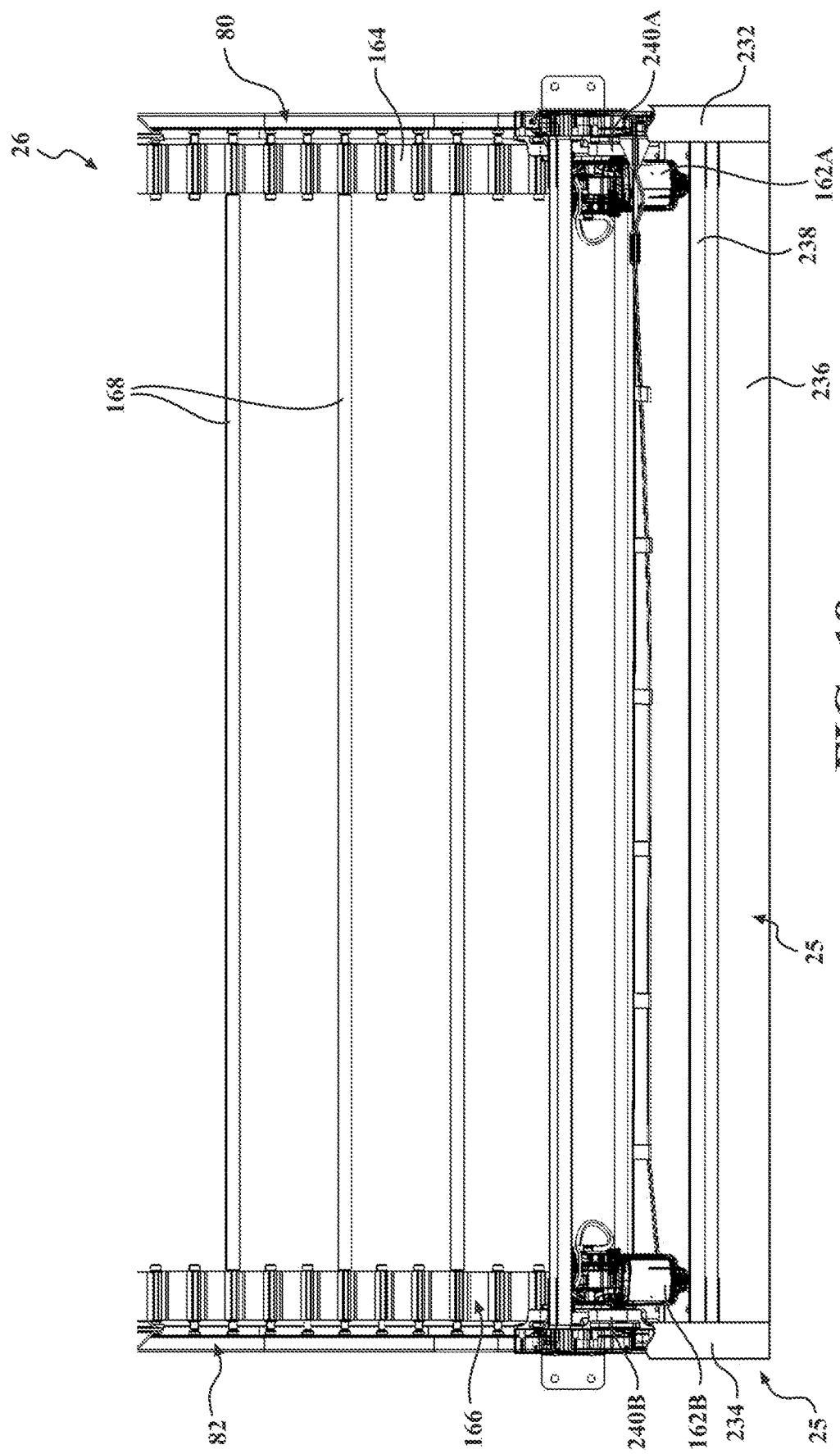
Figure 19:
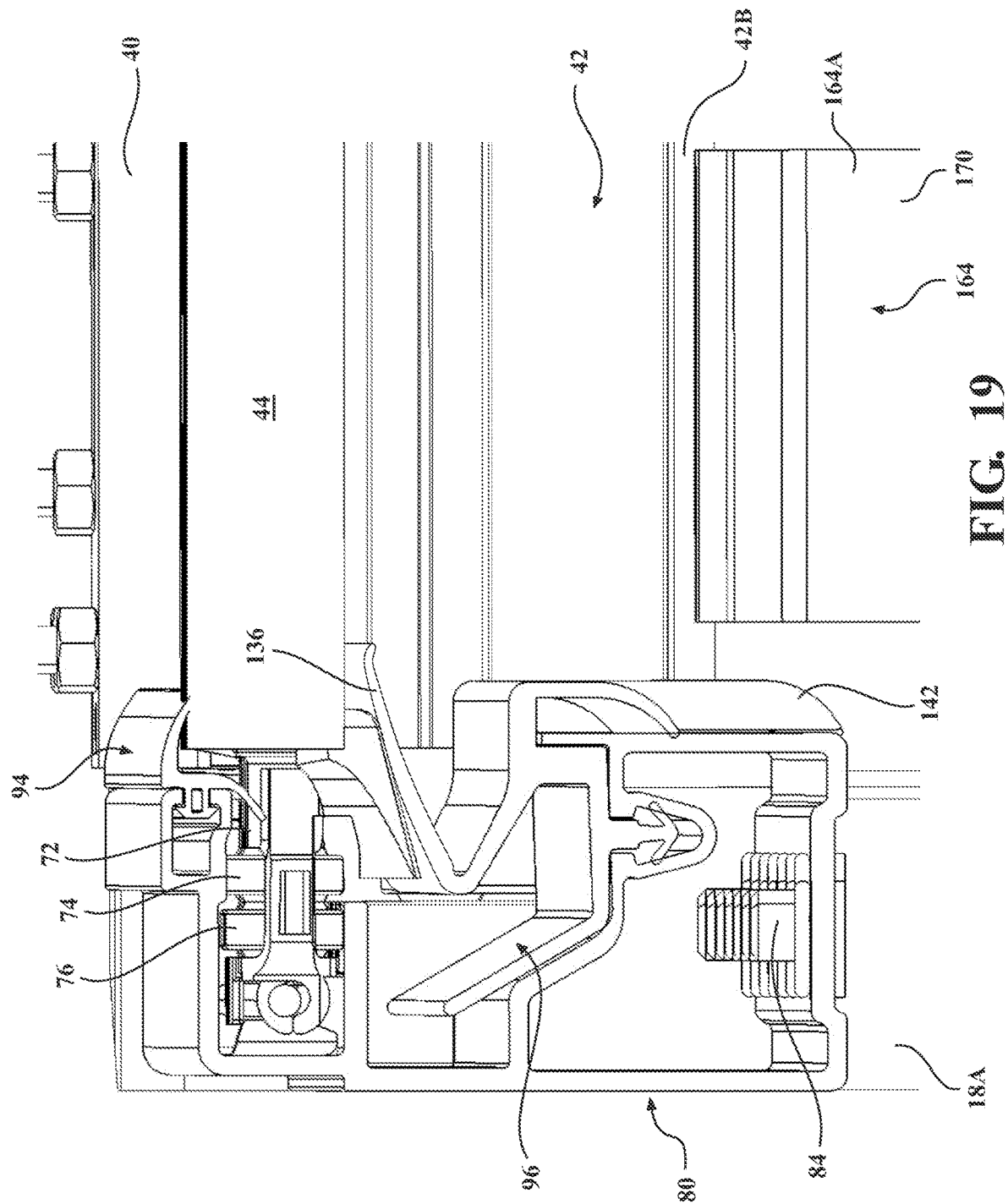
Figure 20:
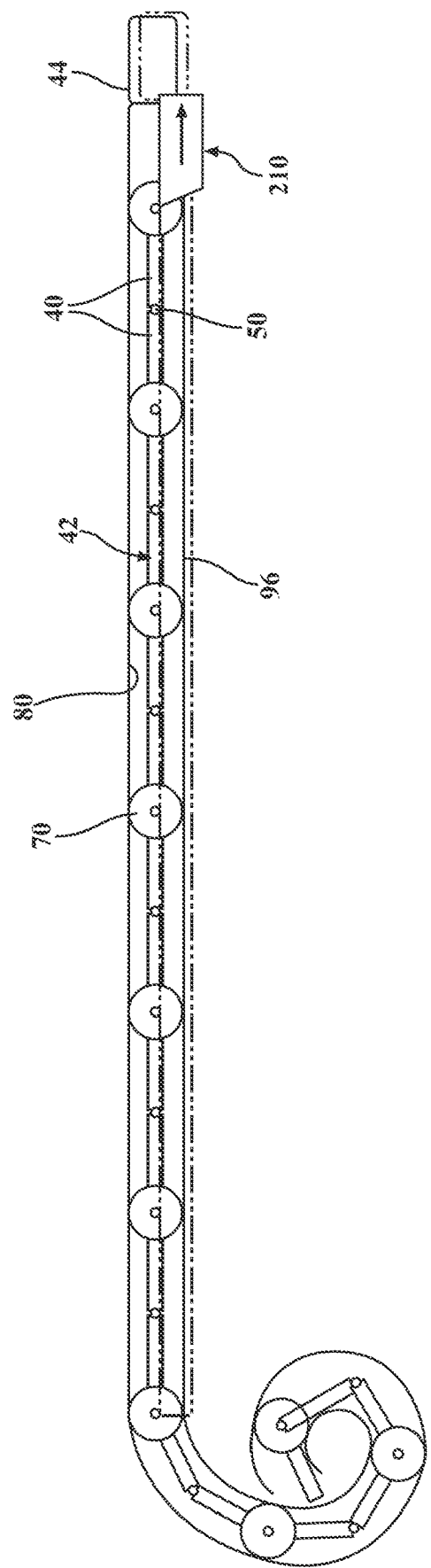
Figure 21:
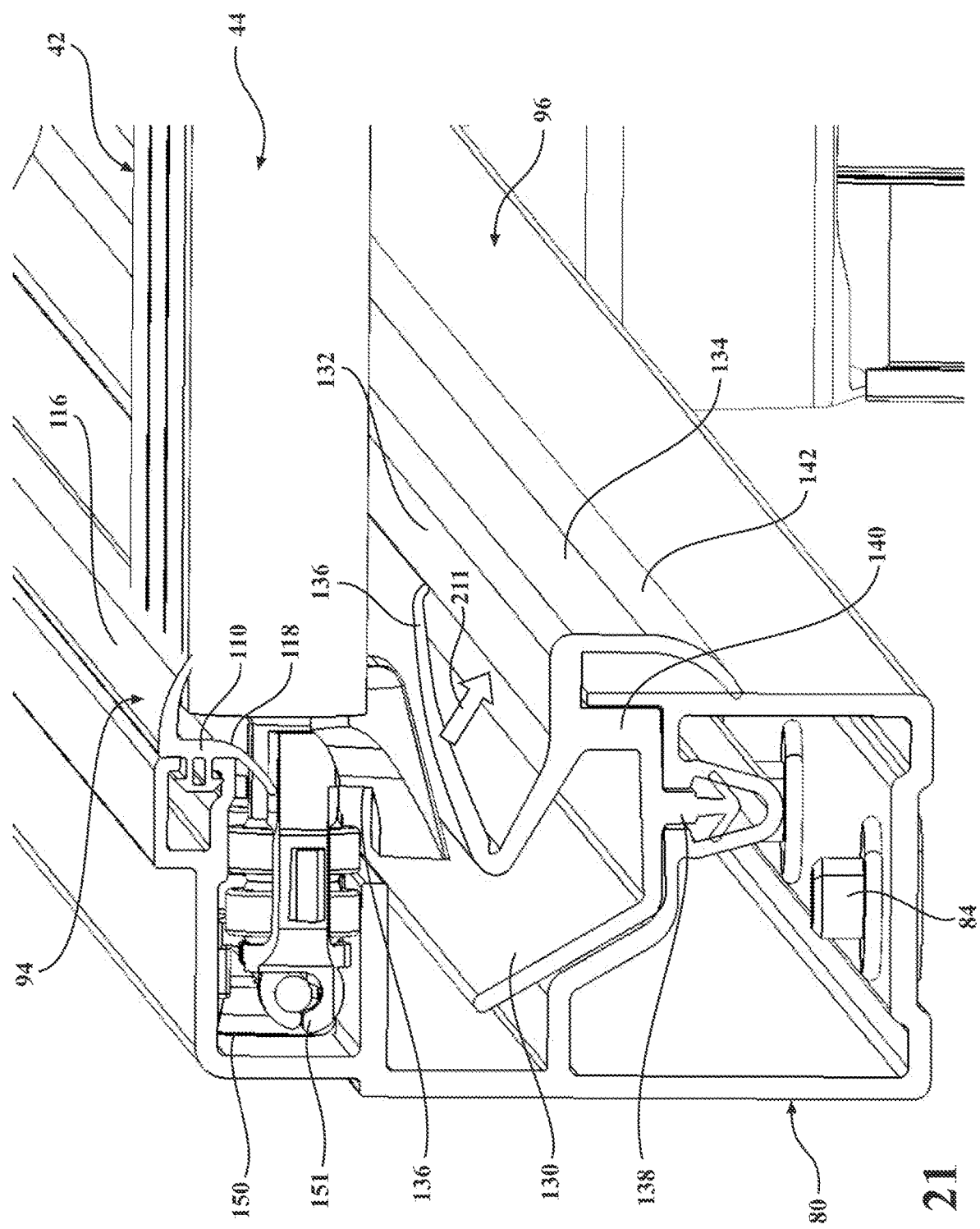
Figure 22:
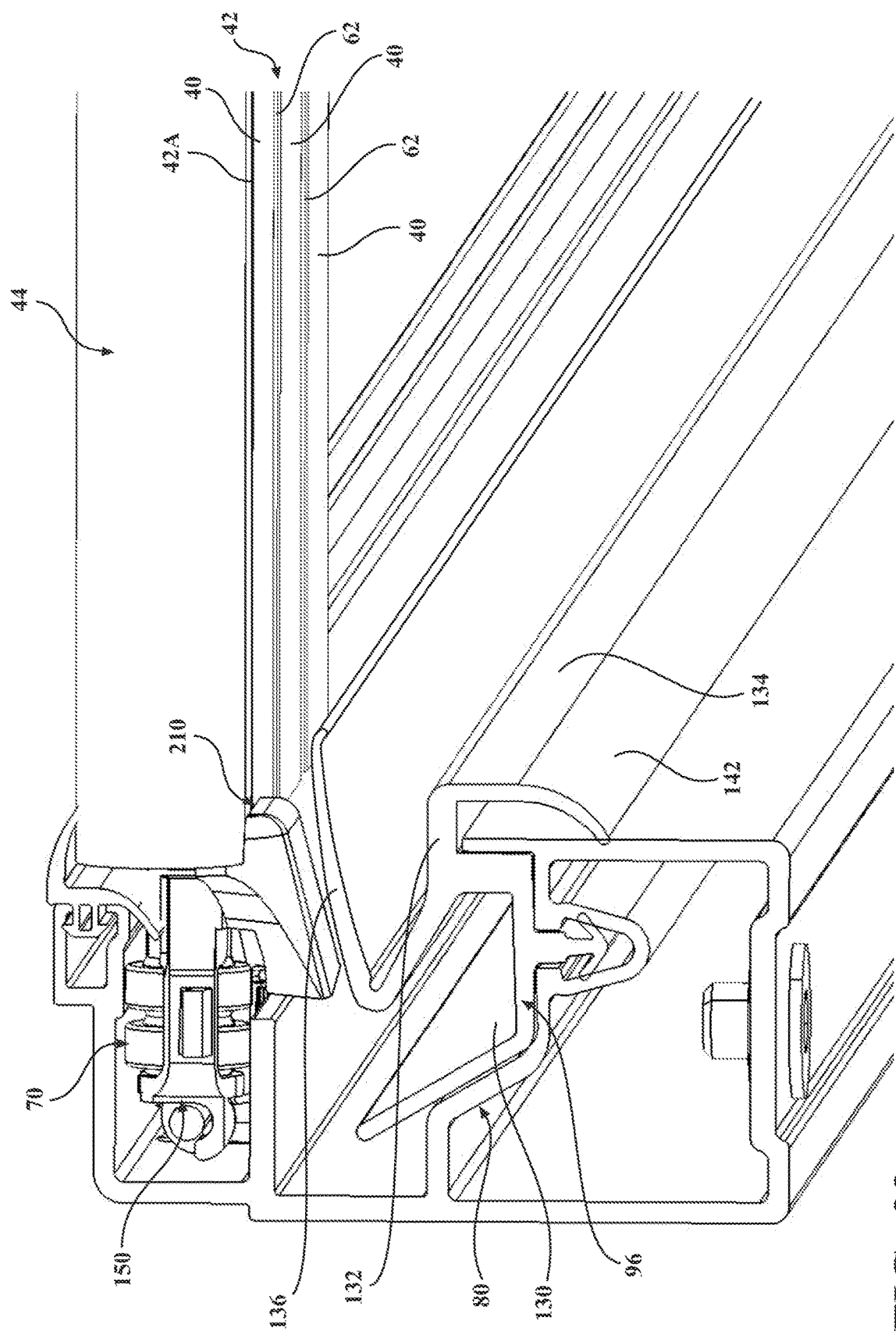
Figure 23:
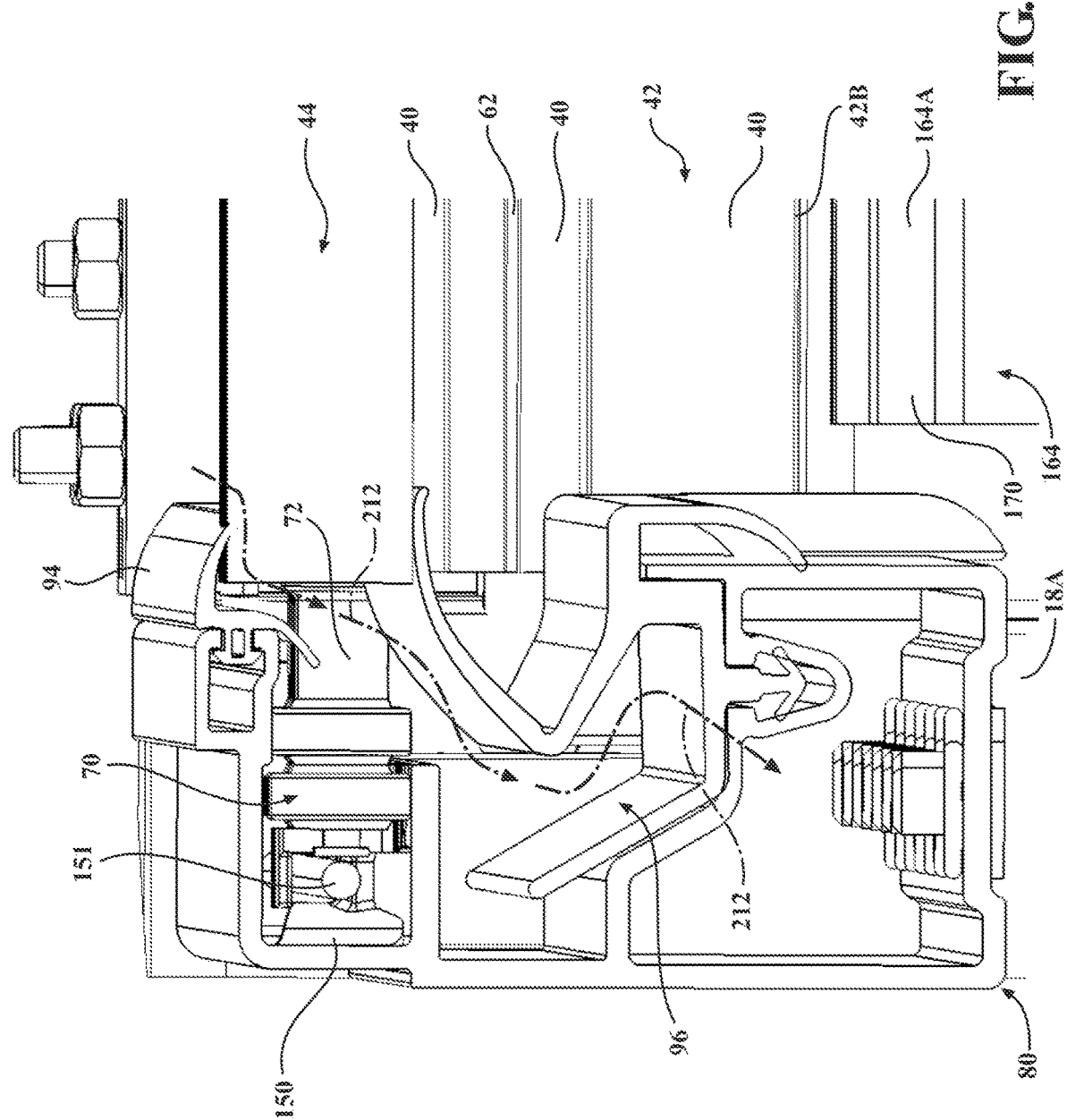
Figure 24:
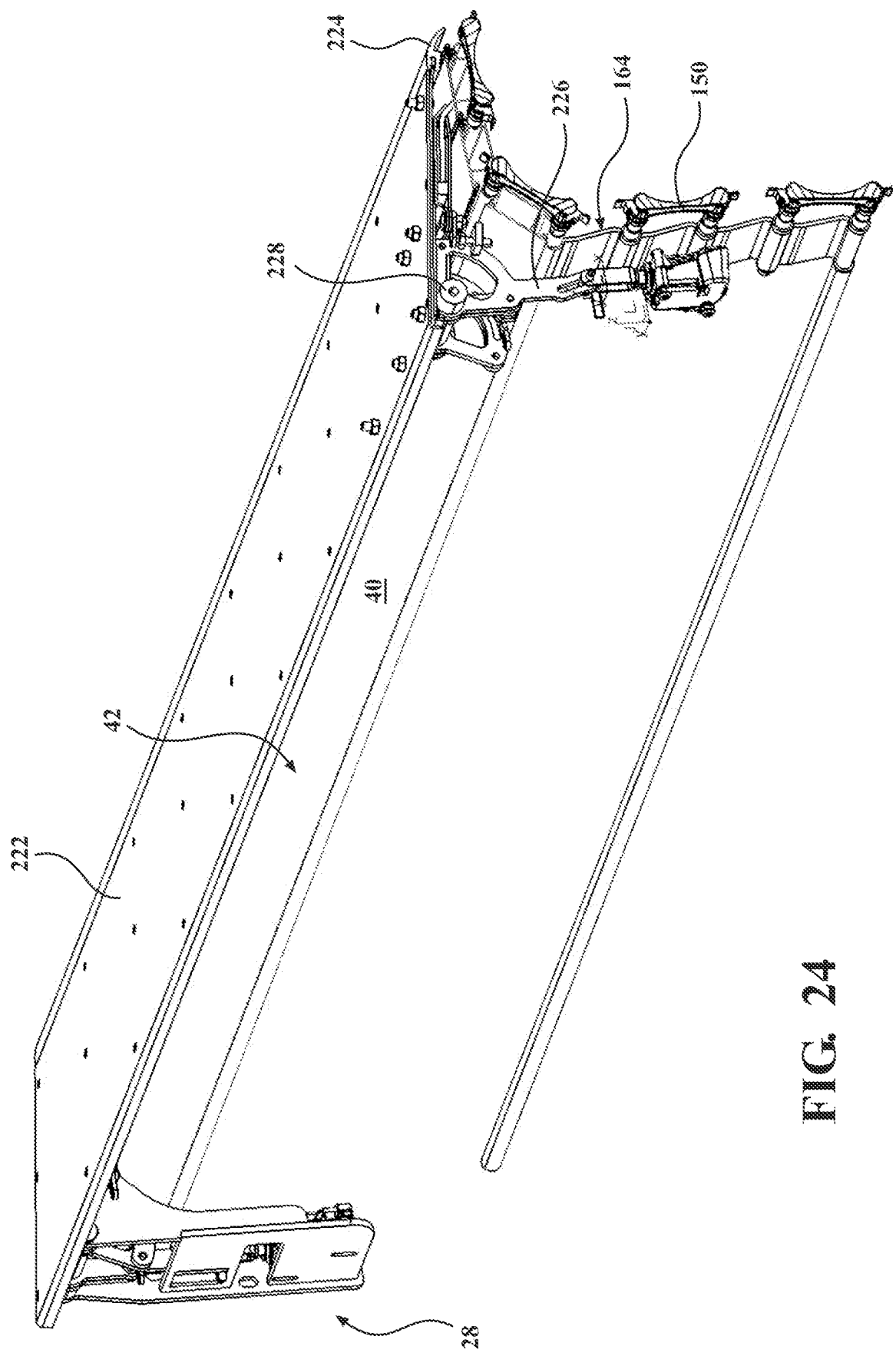
Figure 25:
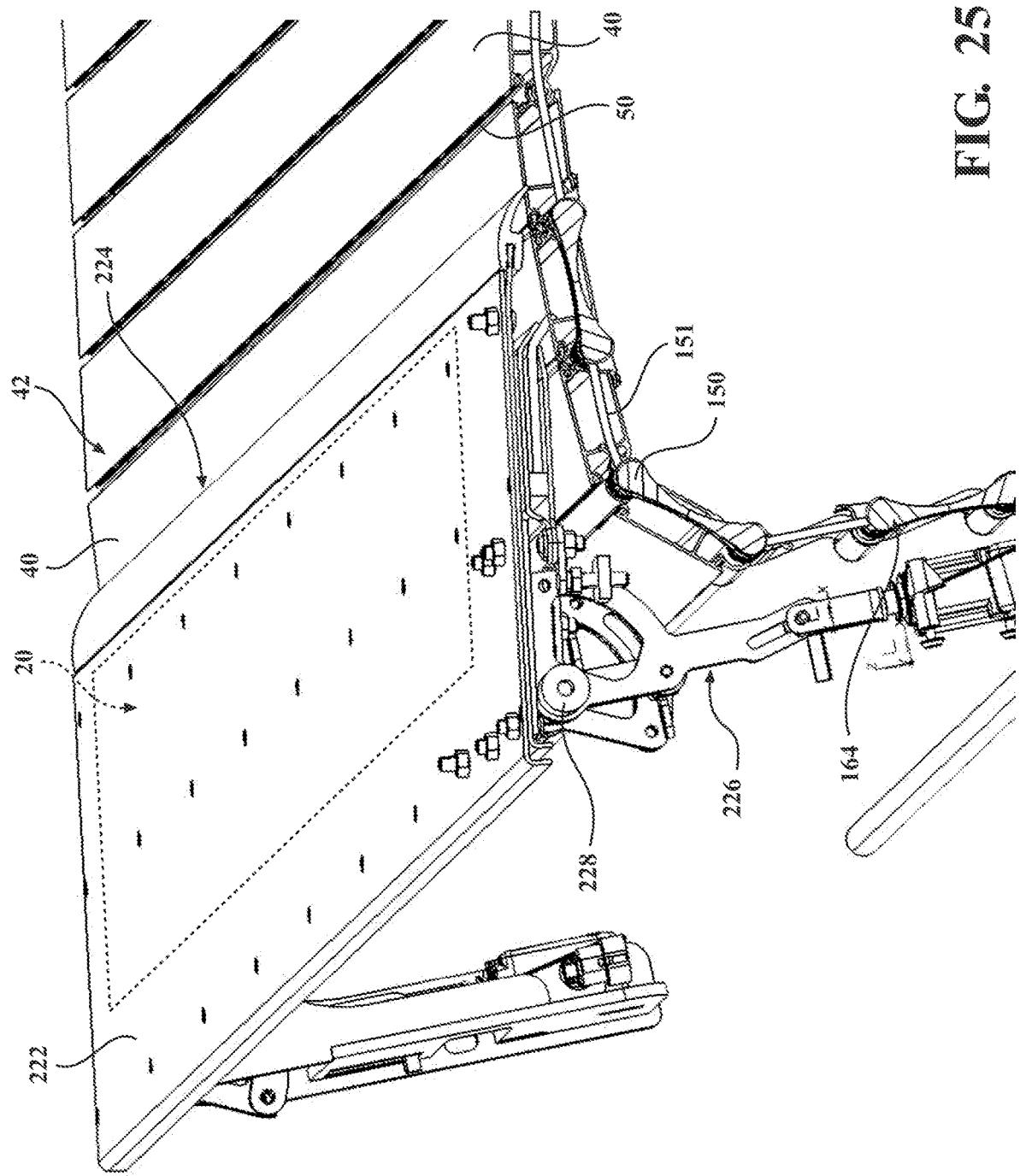
Figure 26:
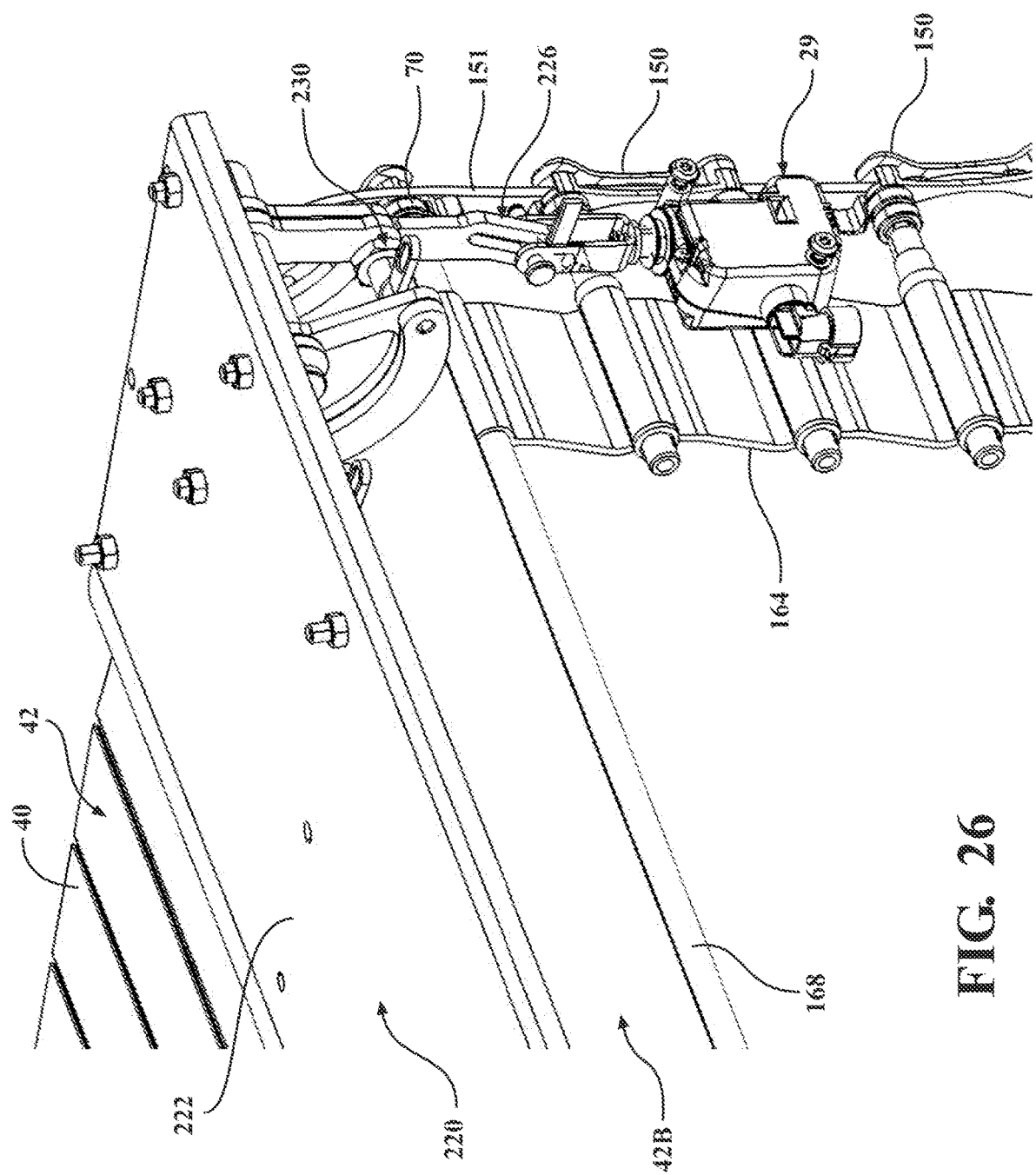
Figure 27:
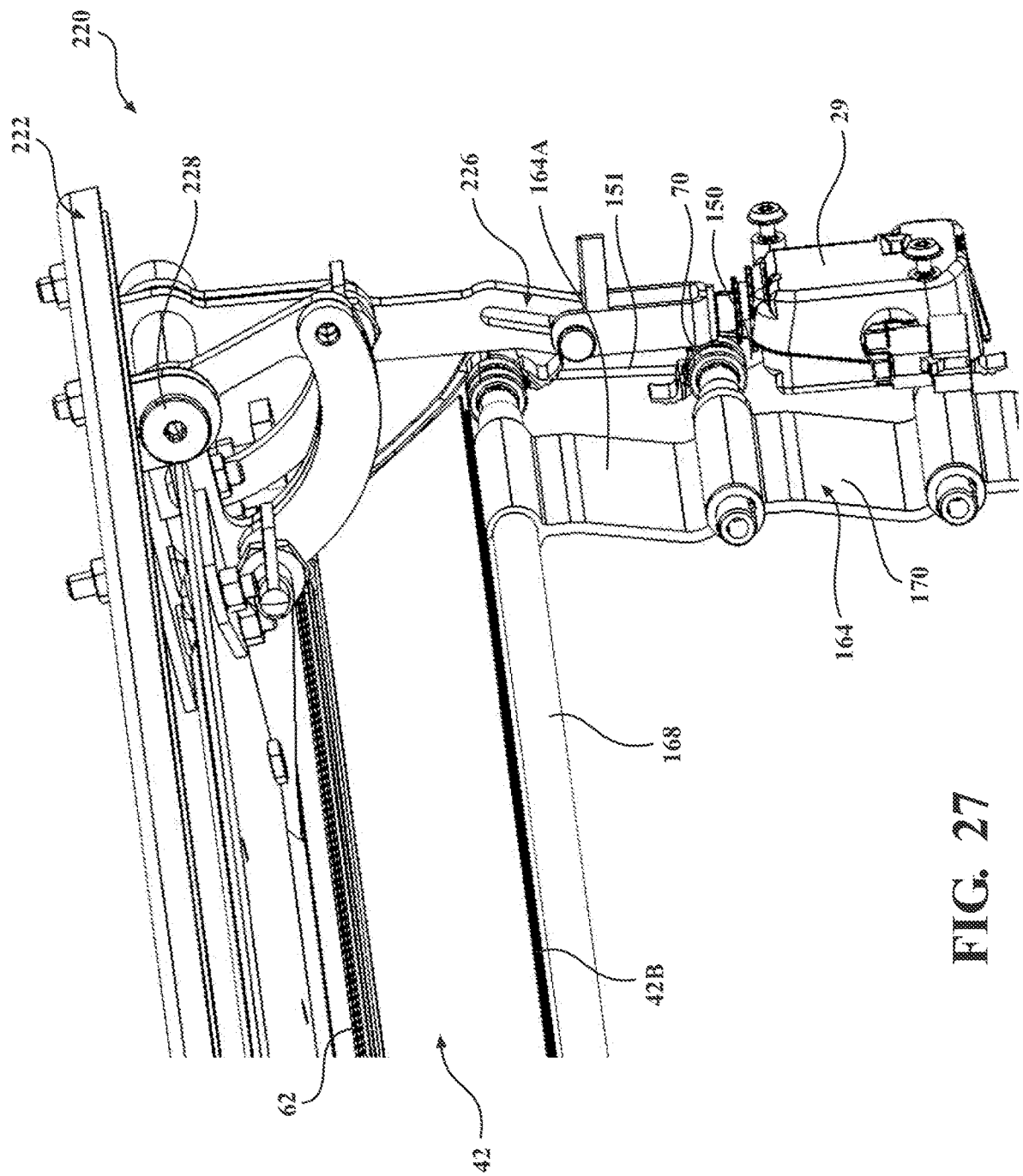
Figure 30:
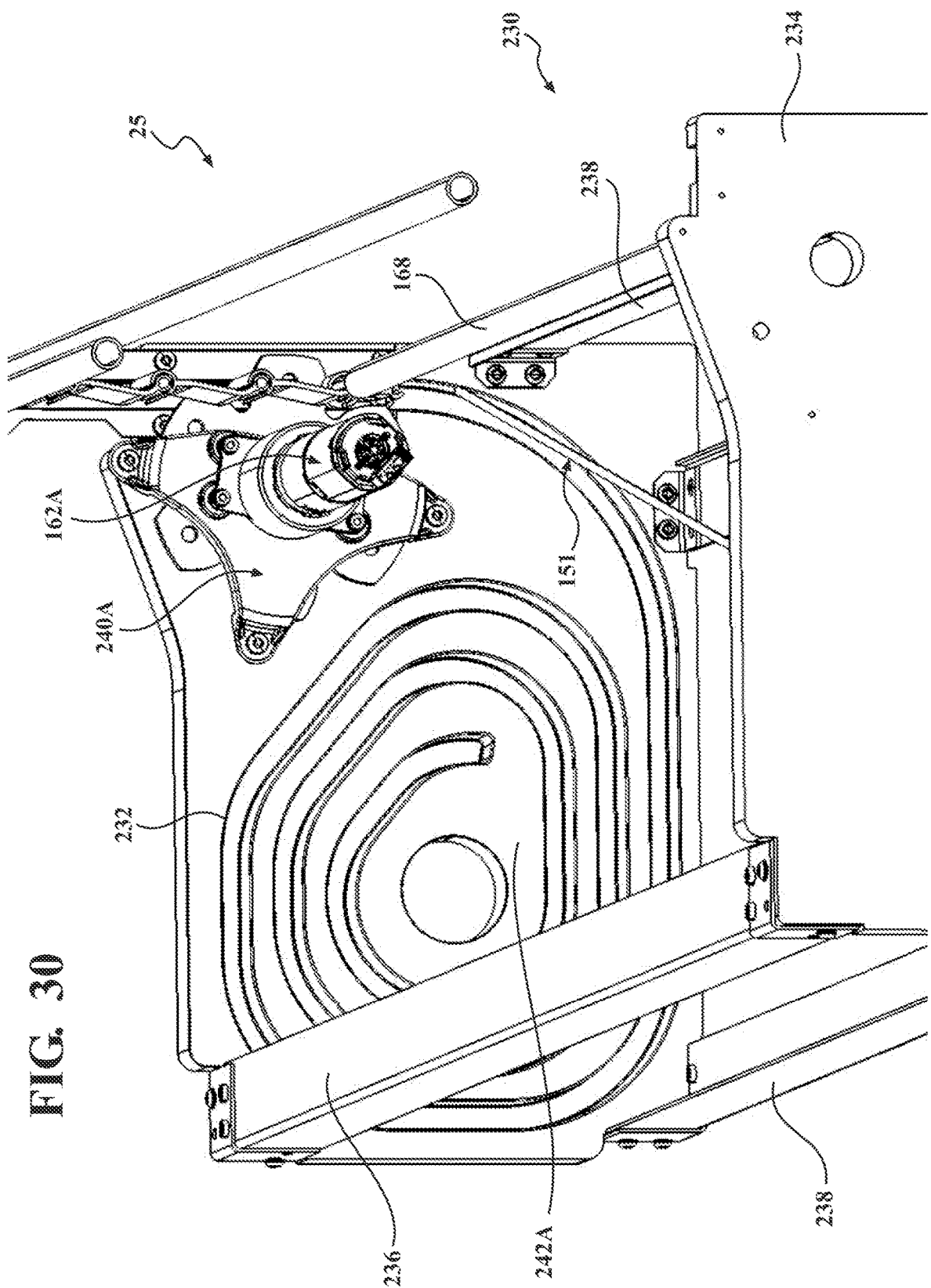
Figure 31:
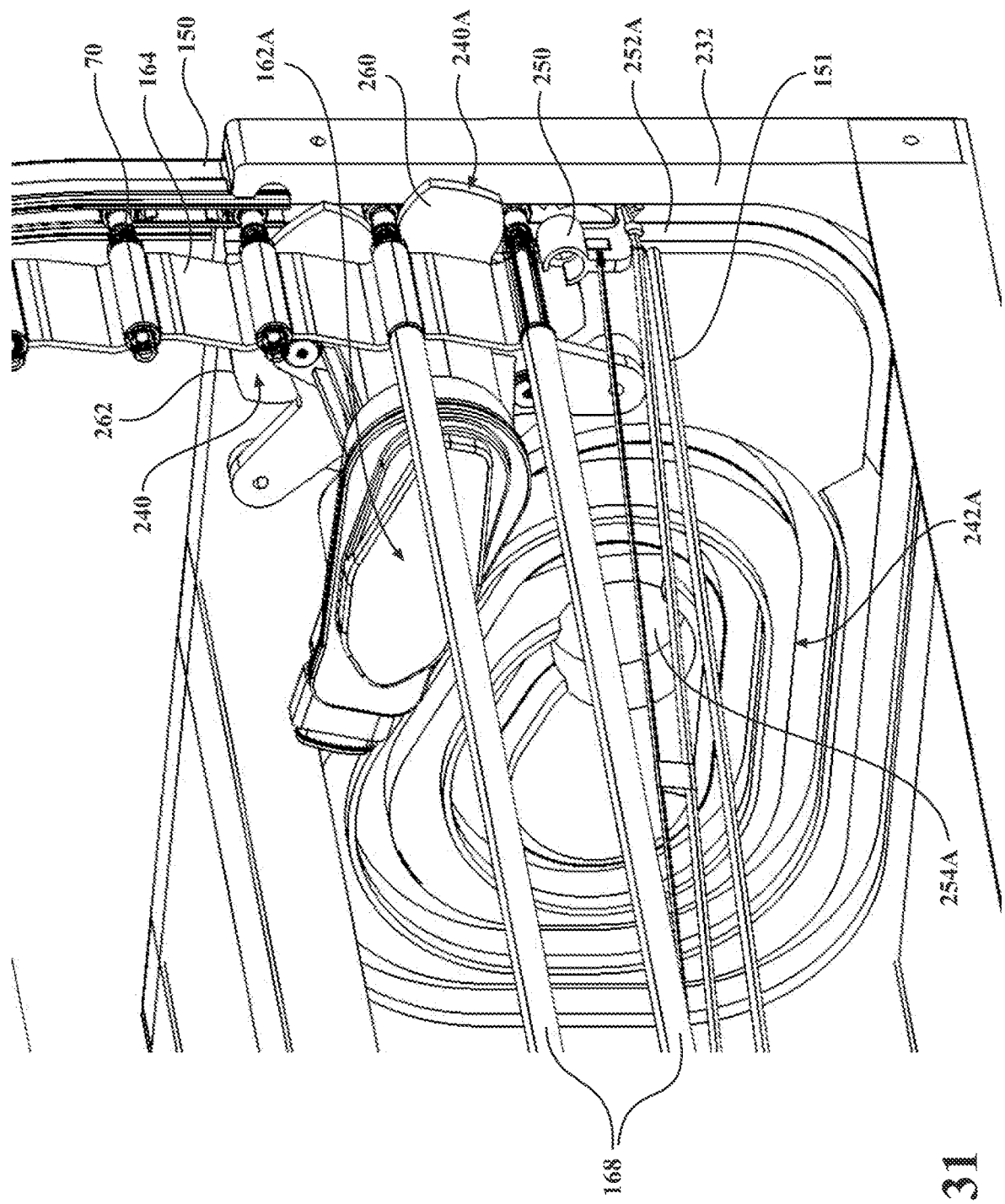
Figure 32A:
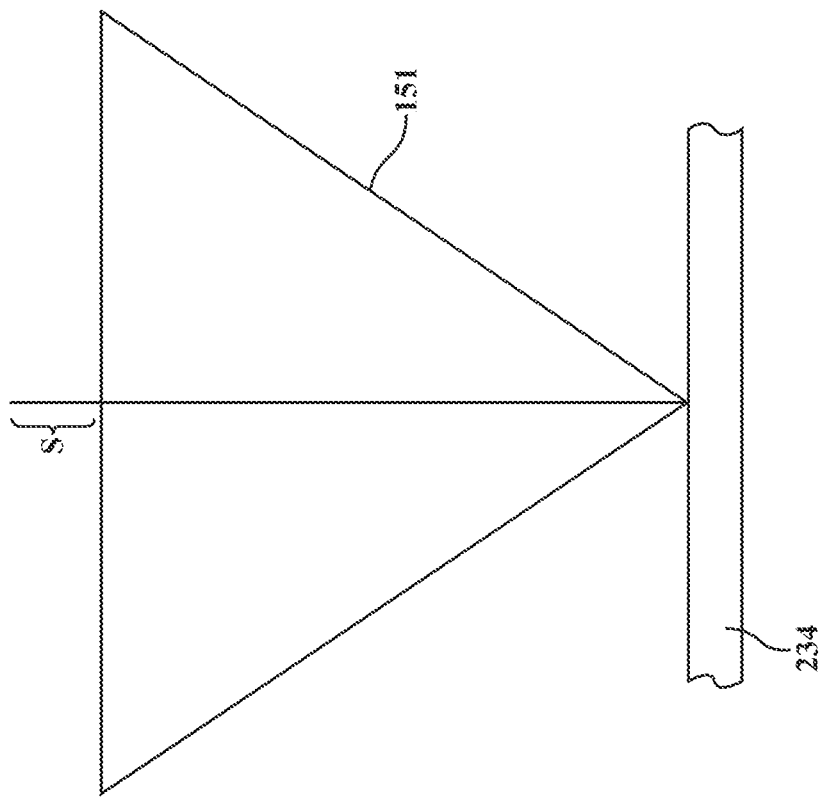
Figure 32B:
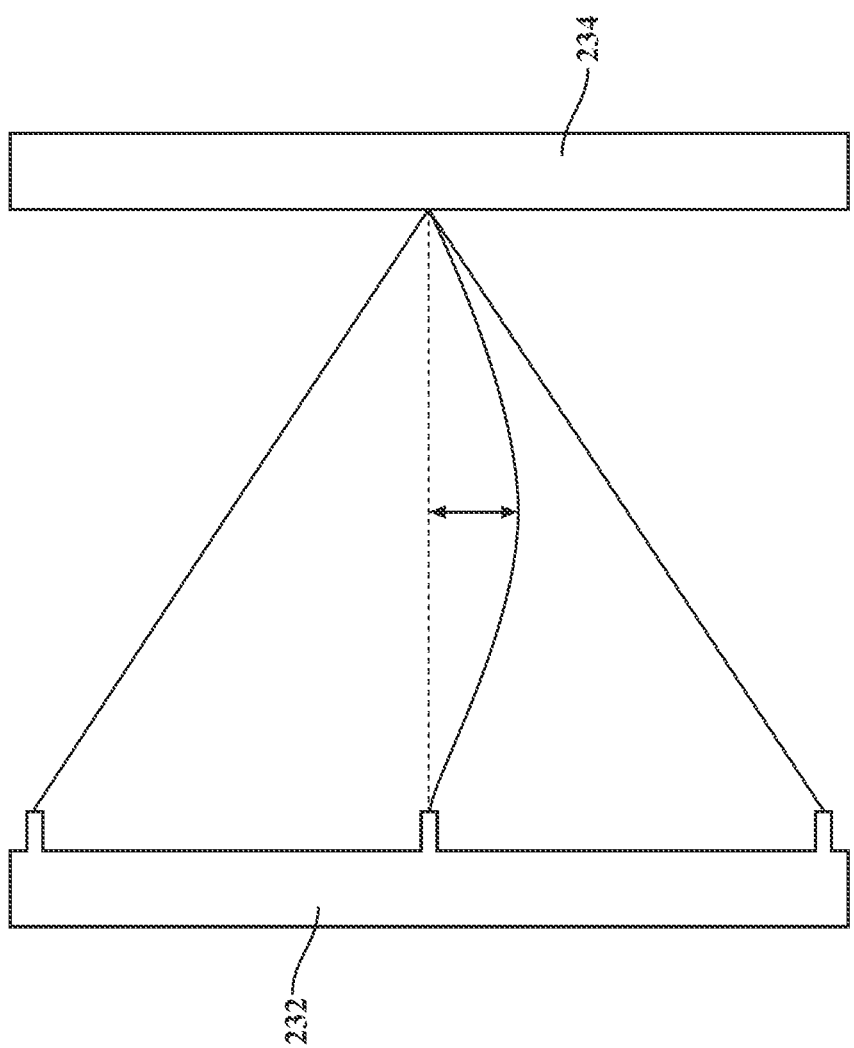
Figure 35:
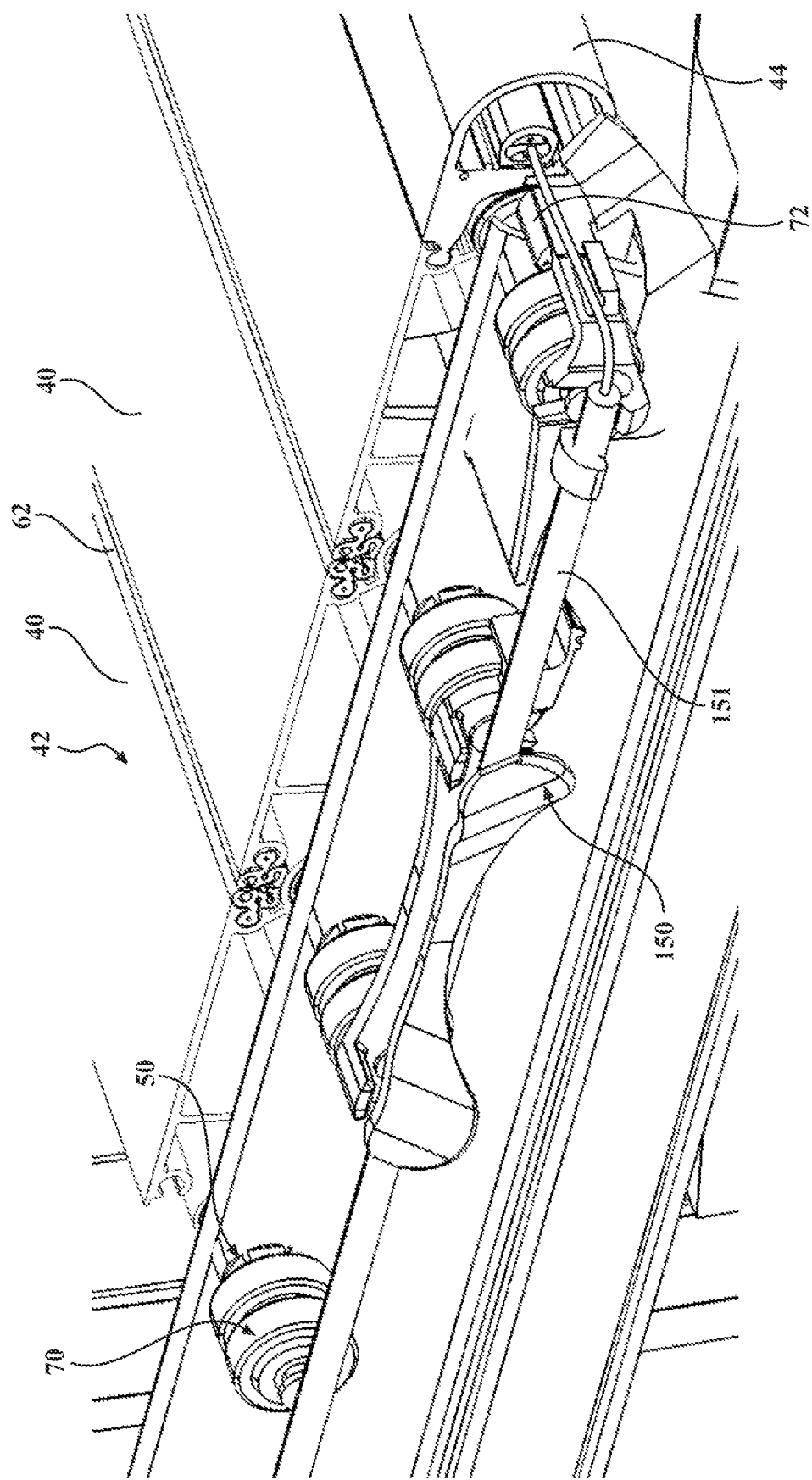

FIGS. 10B through 10E further illustrate various sealing conditions provided by the slat seal unit during relative movement between adjacent slats;

FIG. 11 is a partial sectional view illustrating the dual roller unit operably disposed between the multi-panel tonneau cover and the guide track unit mounted to the cargo bed and further illustrating upper and lower track seal units and portions of a cable management system;

FIG. 12 is a schematic illustration showing the rolling contact arrangement between the guide track unit and each roller of the dual roller unit for providing the anti-rattle feature;

FIG. 13 is similar to FIG. 11 and slightly enlarged to better illustrate the lower track seal unit in both of an unbiased position and a biased position with respect to the dual roller units;

FIG. 14 is a partially sectioned view, generally taken vertically through one of the guide track units, illustrating a cable guide unit associated with the cable management system and shown installed between a pair of dual roller units and having front and rear wiper pads;

FIG. 15 is a schematic illustration of a chain coupling arrangement having a pair of laterally-spaced chain link units configured to interconnect the multi-panel tonneau cover to the electric drive unit;

FIG. 16A is an exploded perspective view illustrating the components associated with the chain link units;

FIG. 16B is an assembled perspective view of one of the chain link units;

FIGS. 16C through 16E illustrate a slightly modified configuration for the chain link units;

FIG. 17 is a view illustrating a portion of one of the chain link units interacting with a portion of a corresponding guide track unit;

FIG. 18 illustrates the chain link units of the chain coupling arrangement interacting with a pair of laterally-spaced electric motors associated with the electric drive unit;

FIG. 19 illustrates a deflector cam associated with a lead end portion of the multi-panel tonneau cover and which is configured to resiliently deflect the lower track seal upon movement of the tonneau cover towards its deployed position, and further illustrates a portion of the chain link unit interacting with a trailing end portion of the tonneau cover;

FIG. 20 diagramatically illustrates the interaction between the deflector cam and the lower track seal upon movement of the tonneau cover toward its deployed position;

FIG. 21 is another perspective view, partially sectioned, to illustrate a water management arrangement including an internal water channel established within each of the guide track units upon deflection of the lower track seals so as to inhibit water intrusion into the cargo bed;

FIG. 22 is an underside perspective view of the leading end portion of the multi-panel tonneau cover showing the interaction between the deflector cam and the lower track seal upon movement of the tonneau cover toward its deployed position;

FIG. 23 further illustrate aspects of the water management arrangement provided between the upper and lower track seal units and the guide track unit to inhibit water intrusion;

FIG. 24 is an assembled view of the applique cover assembly in relation to a portion of the trailing end of the tonneau cover and one of the chain link units;

FIG. 25 is another view, similar to FIG. 24, but showing a power actuator and actuation linkage system used for controlling movement of the applique cover between its opened and closed positions;

FIGS. 26 and 27 are still further perspective views illustrating the components of the power-operated applique cover assembly associated with the closure system of the present disclosure;

FIGS. 28 and 29 illustrate various components of the electric drive unit in more detail including electric motors and a furling mechanism;

FIGS. 30 and 31 illustrate the furling mechanism, one of the electric motors and the cable attachment between the cable management system and the electric drive unit;

FIGS. 32A and 32B are top and side diagrammatical views illustrating a low slack cable attachment configuration associated with the present disclosure;

FIG. 33 illustrates a cog-type drive mechanism driven by the electric motors and which interacts with the dual roller units for driving tonneau cover between its retracted and deployed positions;

FIG. 34 illustrates an embedded furling channel formed in the storage box of the drive unit for compact retention of the tonneau cover in its retracted position therein; and FIG. 35 illustrates components of the cable management system in association with the dual roller units and the leading end portion of the tonneau cover.

Corresponding reference numbers are used to indicate corresponding components throughout the multiple views associated with the above-identified drawings.

DETAILED DESCRIPTION OF EXAMPLE EMBODIMENTS

One of more example embodiments of a power-operated closure system for use with motor vehicles will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In general, the present disclosure relates to closure systems of the type used in motor vehicles to move a closure panel between first and second positions using a power-operated drive unit. More specifically, a closure system embodying the aspects of the present disclosure includes: a closure panel; a chain linkage mechanism interconnecting the closure panel to the drive unit; a guide track mechanism; a dual roller mechanism interconnecting the closure panel to the guide track mechanism to provide an anti-rattle feature; a track sealing mechanism providing an anti-water intrusion feature; a moveable applique cover having a power-operated actuator; a closure panel furling mechanism associated with the drive unit; and a control system for controlling actuation of power-operated drive unit and the power-operated actuator. Each of these structural mechanisms and their components will be described in conjunction with one or more example embodiments. However, the specific example embodiment(s) disclosed is/are merely intended to describe the aspects, features, advantages and advancements provided by the inventive concepts of the present disclosure with sufficient clarity to permit those skilled in the art to understand and practice the disclosure.

Figure 1:
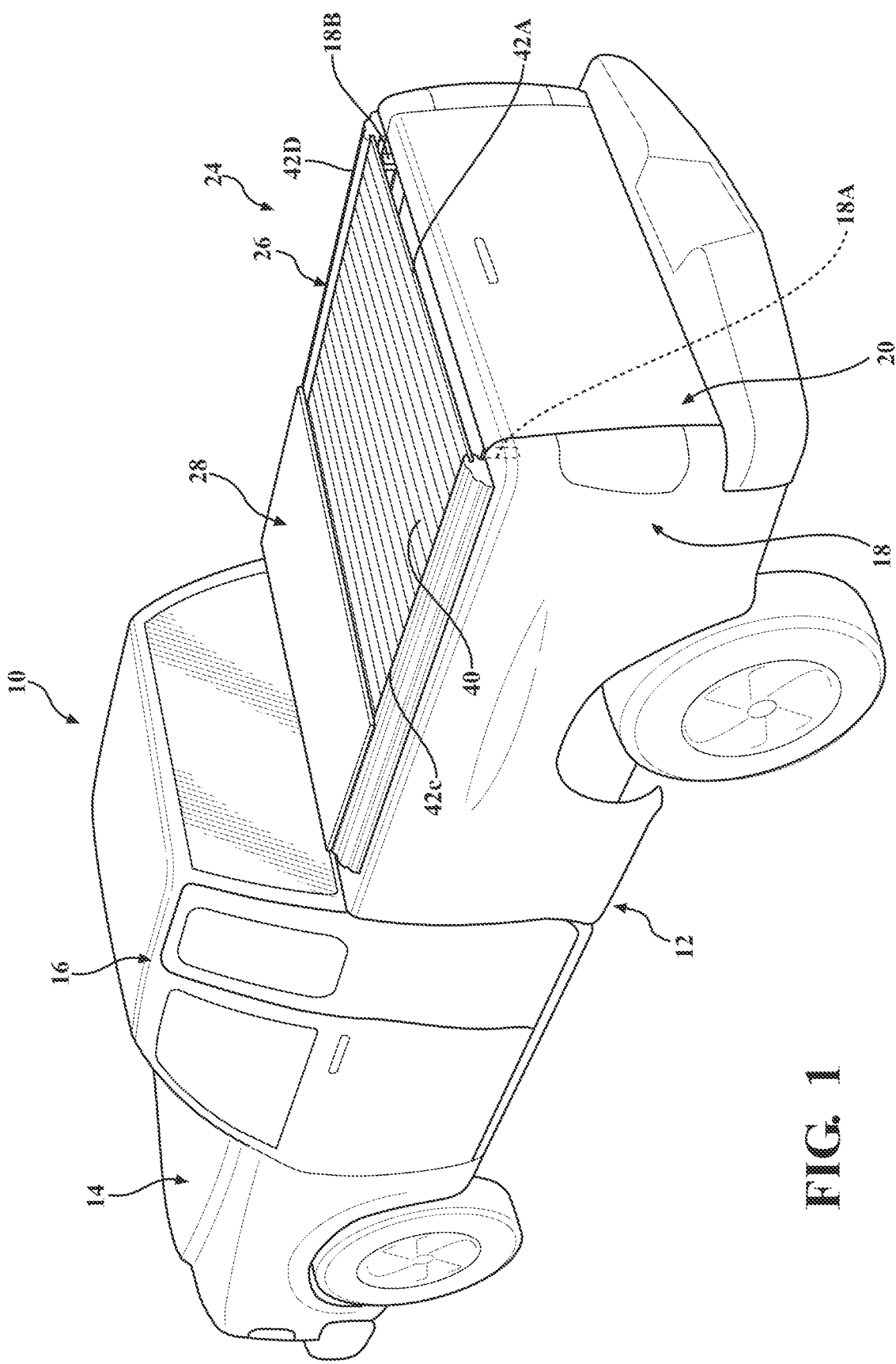
FIG. 1 illustrates a motor vehicle equipped with a power-operated closure system constructed in accordance with the teachings of the present disclosure and including a multi-panel tonneau cover shown in a deployed position for enclosing a cargo bed and an applique cover shown in a closed position.
Figure 2:
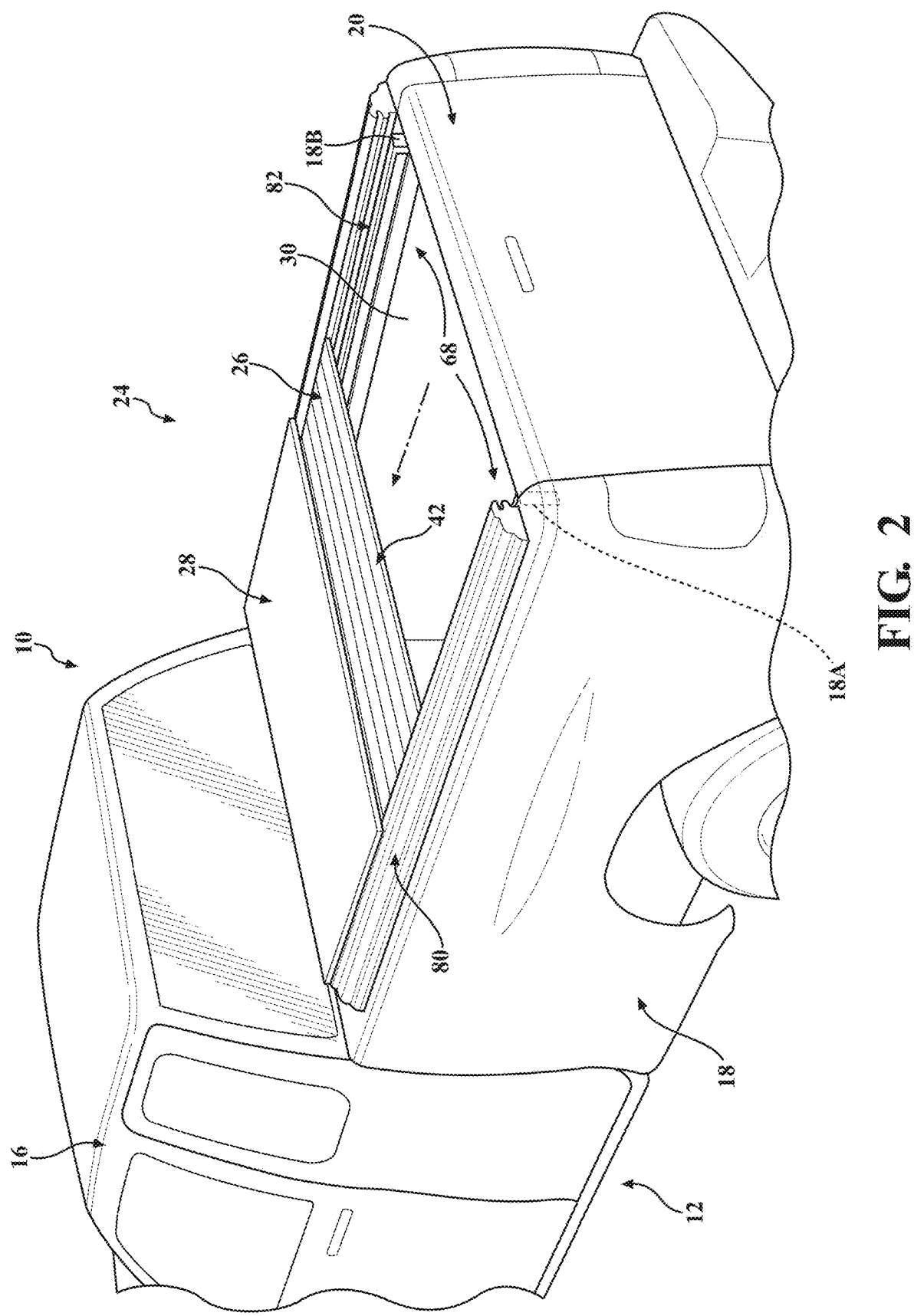
FIG. 2 is generally similar to FIG. 1 but now shows the multi-panel tonneau cover located in a partially retracted position with the applique cover maintained in its closed position.
Figure 3:
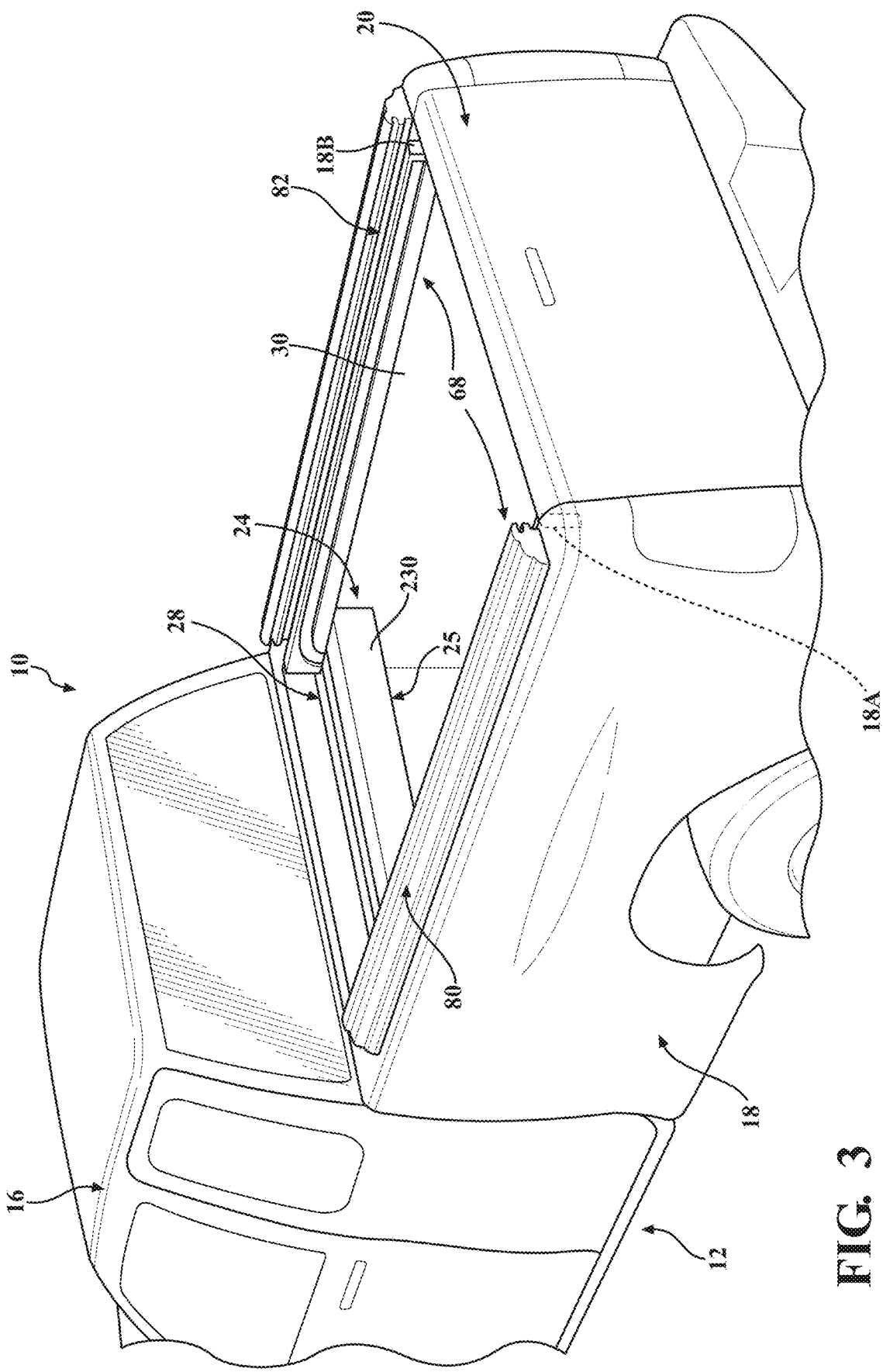
FIG. 3 is another isometric view of the motor vehicle, with the applique cover removed for additional clarity, showing the multi-panel tonneau cover in a fully retracted position and stored with a storage compartment of an electric drive unit associated with the power-operated closure system of the present disclosure.
Figure 4:
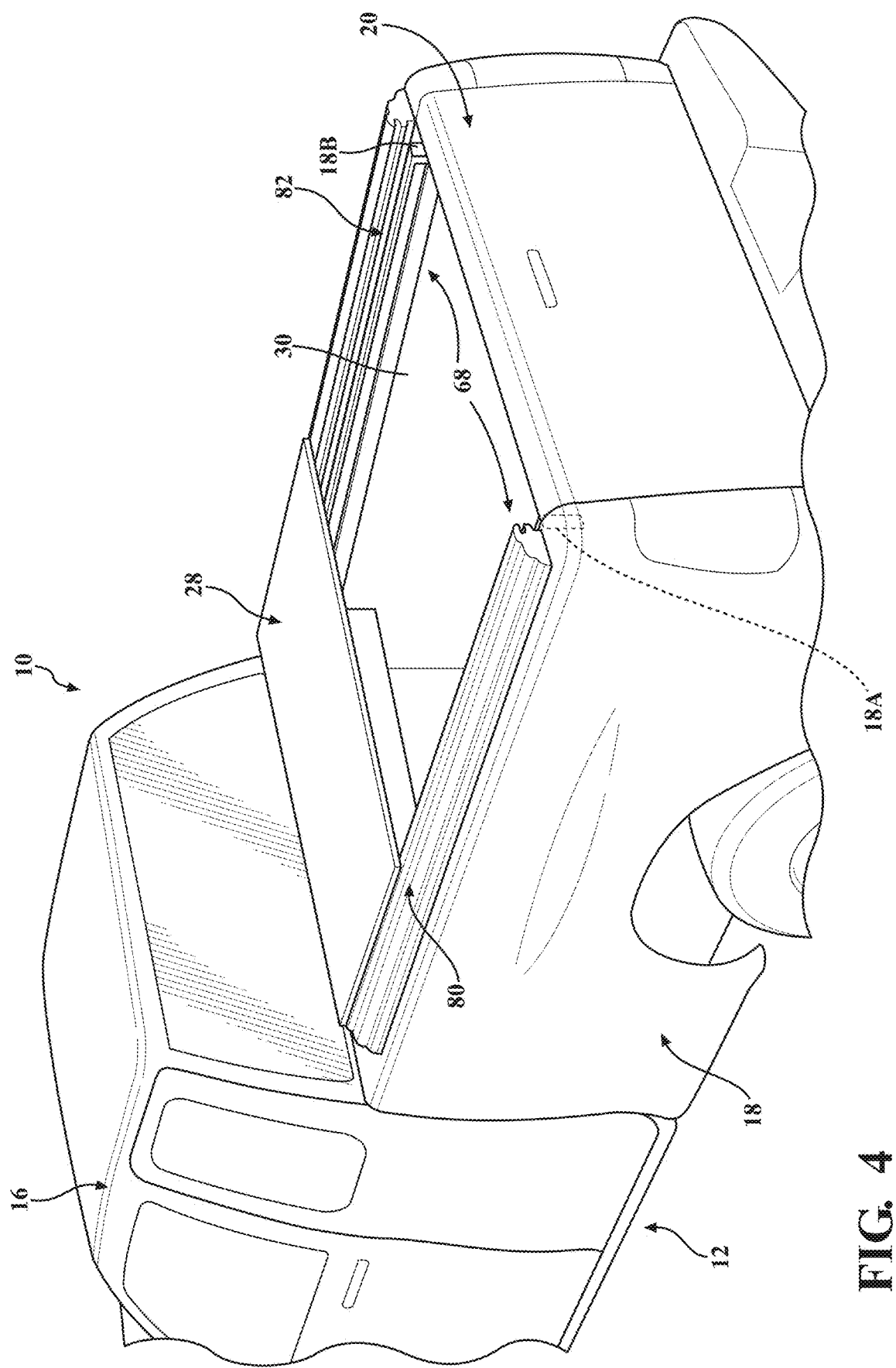
FIG. 4 illustrates the motor vehicle with the applique cover in its closed position and with the multi-panel tonneau cover fully retracted into the electric drive unit.
Figure 5:
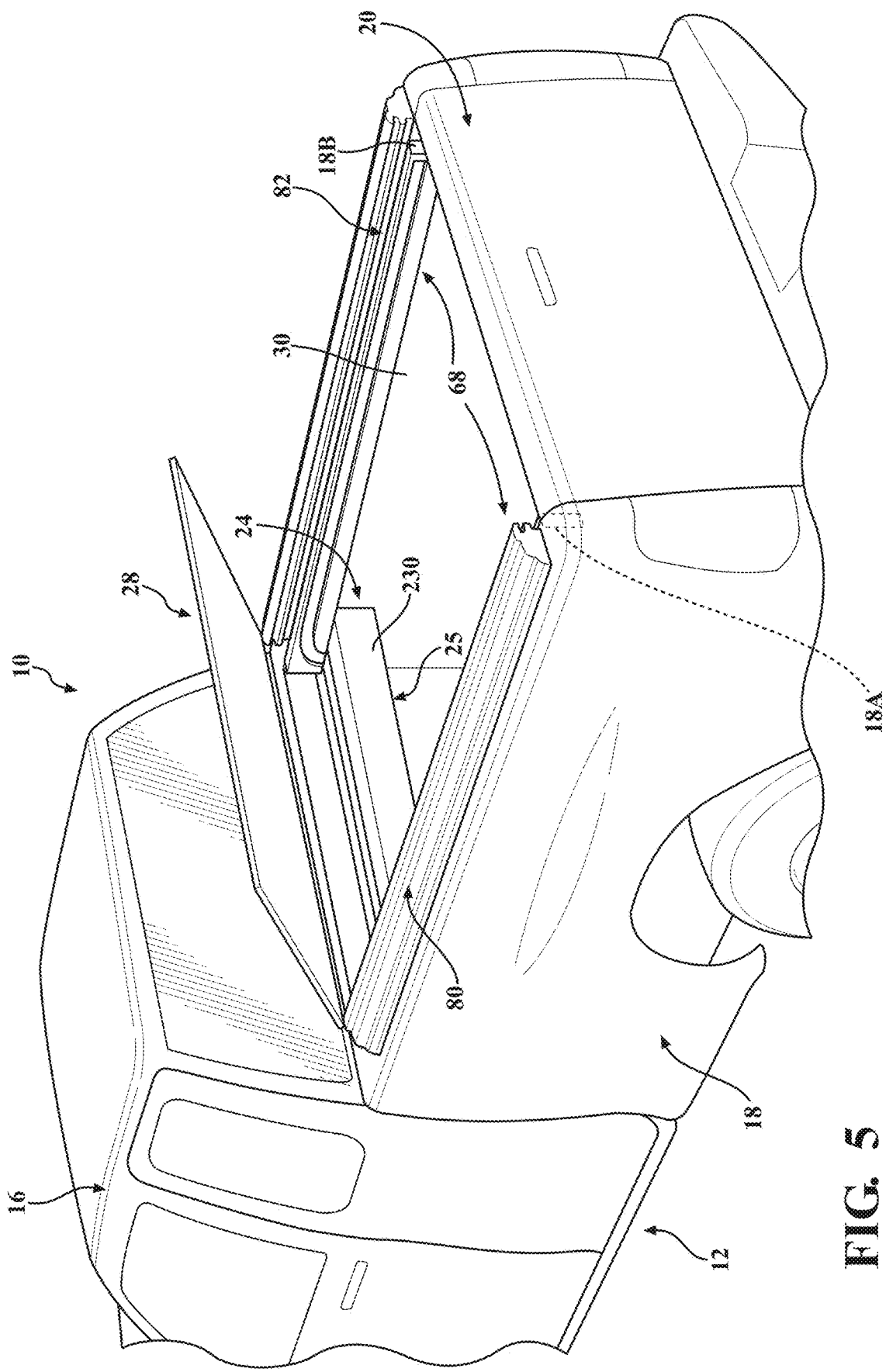
FIG. 5 illustrates the motor vehicle with the applique cover moved to an opened position with the multi-panel tonneau cover fully retracted into the storage compartment of the electric drive unit.
Figure 6:
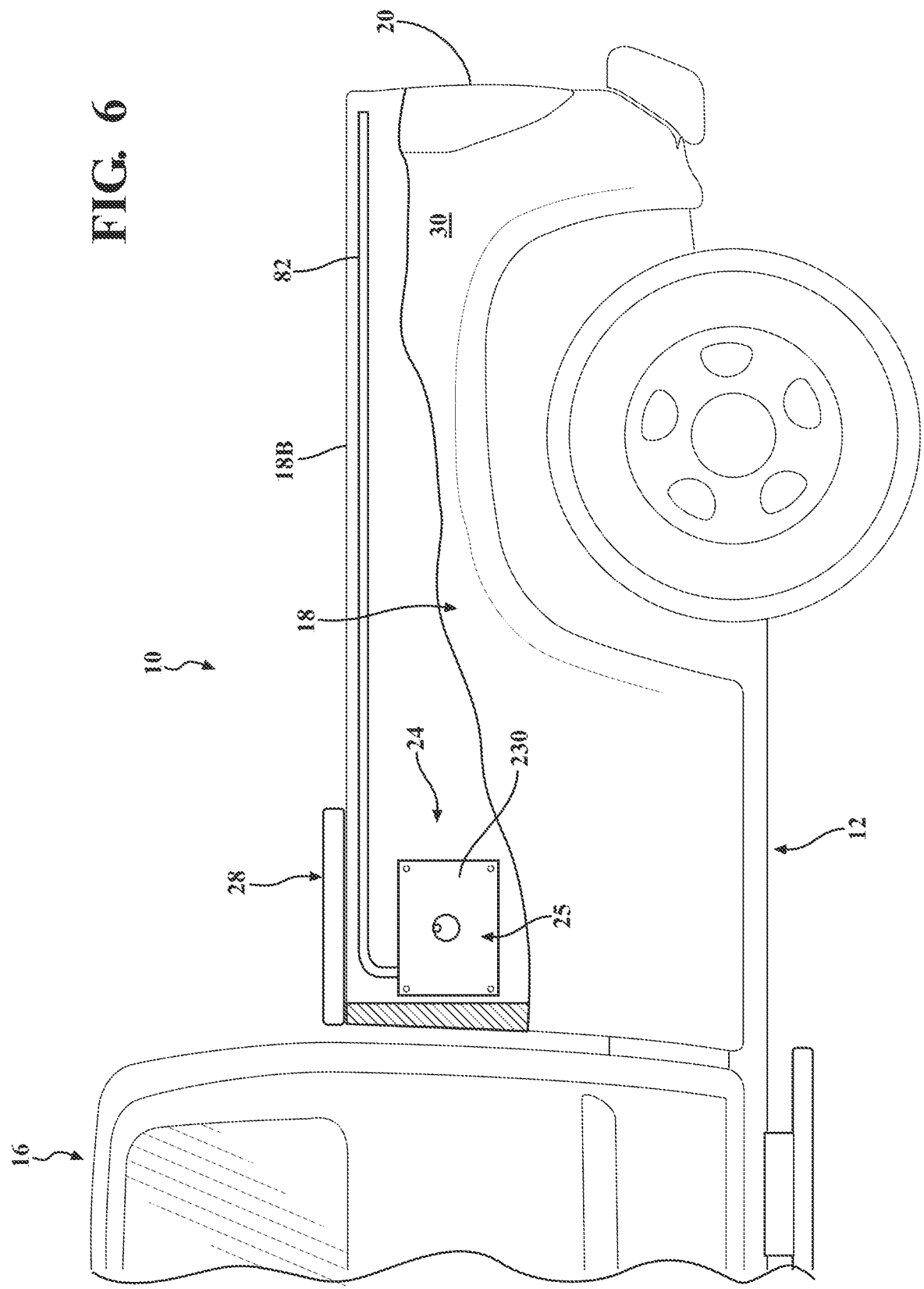
FIG. 6 is a schematic side elevation illustration of the motor vehicle generally showing the location of the electric drive unit, the applique cover, and one of a pair of guide track units provided for guiding movement of the multi-panel tonneau cover in relation to the cargo bed.
Figure 7:
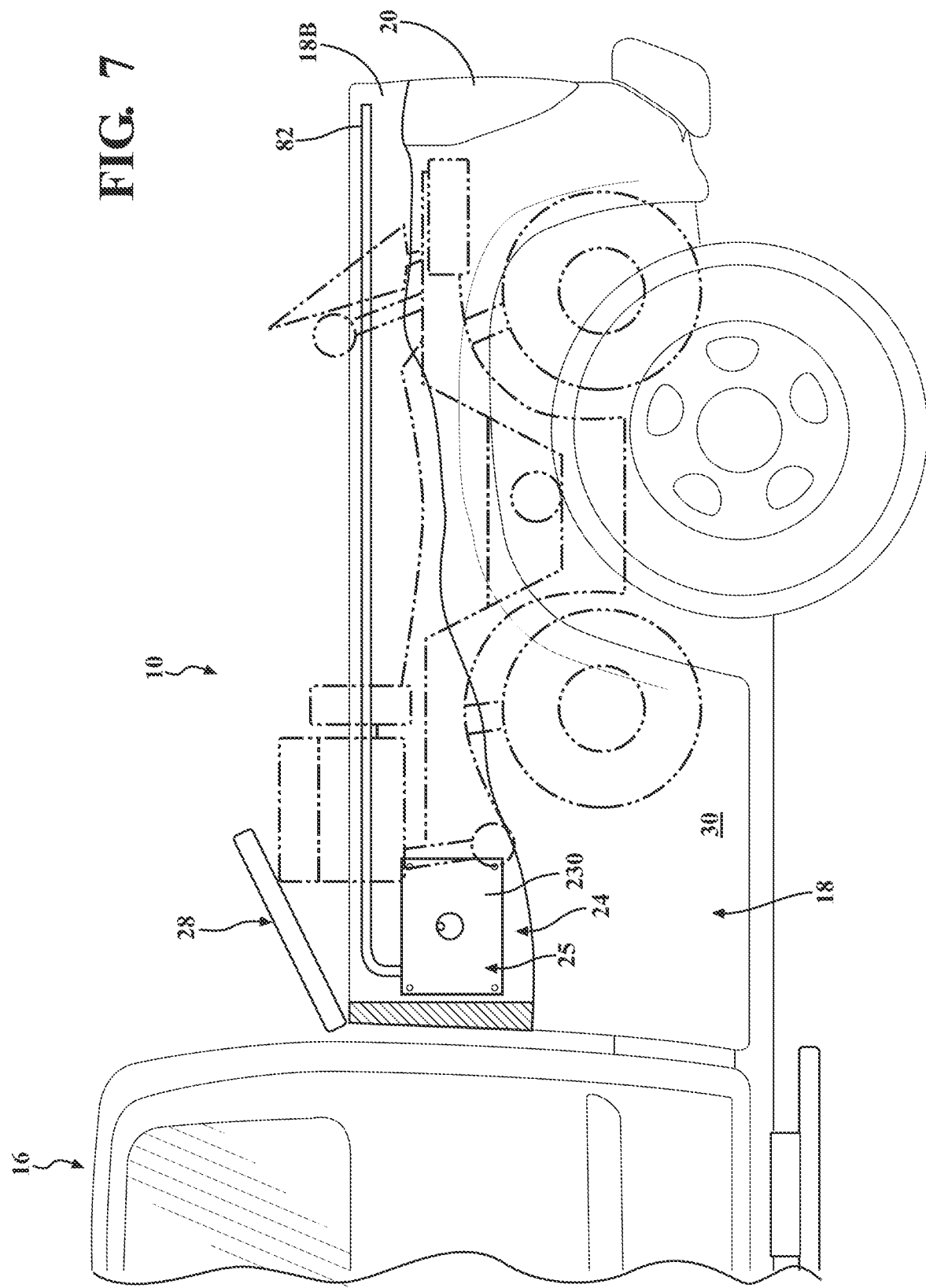
FIG. 7 is another schematic side elevation illustration, similar to FIG. 6, but now showing the applique cover in its opened position to provide increased storage space within the cargo bed.

Referring initially to FIG. 1 of the drawings, a motor vehicle 10 is shown to include a vehicle body 12 defining an engine compartment 14, a passenger compartment or cab 16, and a cargo compartment or bed 18. In this non-limiting embodiment, vehicle 10 is configured as a pickup truck with cargo bed 18 having a tailgate 20 moveable between closed and opened positions in an otherwise convention manner. As will be detailed hereinafter with greater specificity, motor vehicle 10 is further equipped with a closure system 24 arranged to selectively enclose an internal storage space 30 defined within cargo bed 18. To this end, FIG. 1 shows a closure panel 26 associated with closure system 24 in a fully deployed position and an applique cover 28 located in a lowered (i.e. closed) position. Closure system 24 includes a first power-operated drive unit 25 operable to move closure panel 26 between its fully deployed position and a fully retracted position and further includes a second power-operated drive unit 29 operable to move applique cover 28 between its lowered position and a raised (i.e. opened) position. FIG. 2 is provided to show closure panel 26 moved, via selective powered-actuation of closure system 24, to a partially retracted position while applique cover 28 is maintained in its closed position. FIG. 3 is provided (with applique cover 28 removed for additional clarity only) to show closure panel 26 now moved, via selective powered-actuation of closure system 24, to its fully retracted position and stored within a storage compartment, also referred to as storage box 230, of first power-operated drive unit 25. FIGS. 4 and 6 are provided to show applique cover 28 located in its closed position with closure panel 26 located in its fully retracted position. FIG. 5 is provided to show applique cover 28 located in its opened position with closure panel 26 located in its fully retracted position (stowed in storage box 230). Finally, FIG. 7 is provide to illustrate the increased storage capacity available within storage space 30 of cargo bed 18 when closure panel 26 is fully retracted and applique cover 28 is located in its opened position, while also facilitating an ability to service the tonneau first power-operated drive unit 25 and storage box 230, if needed. Applique cover 28 is configured to reduce and inhibit water and dirt ingress into storage space 30 and onto the tonneau first power-operated drive unit 25 and storage box 230, thereby protecting the tonneau first power-operated drive unit 25 and storage box 230 against contamination and damage. To improve sealing of applique cover 28 relative to closure panel 26, a cover seal 224 (FIGS. 24 and 25) is provide at the rear edge portion of applique cover 28. Cover seal 224 can be provided as a resilient material, such as rubber, by way of example and without limitation, to facilitate forming a tight seal against closure panel 26 both during static (closure panel 26 is stationary relative to applique cover 28) and dynamic (closure panel 26 is moving relative to applique cover 28) conditions. It is contemplated that in order to best avoid wear of cover seal 224, applique cover 28 can be at least partially opened prior to retraction/deployment of closure panel 26 to maintain the sealing integrity of the cover seal 224.

In accordance with the teachings of the present disclosure, closure panel 26 is configured as a multi-panel assembly defined by a plurality of interconnected slats 40 to provide a retractable tonneau cover 42 having a front or leading end portion 42A and a rear or trailing end portion 42B. Each slat 40 extends laterally across cargo bed 18 and has a first or driver-side edge portion 42C and a second or passenger-side edge portion 42D. An end coupling 44 is attached to leading end portion 42A of tonneau cover 42 and extends laterally between edge portions 42C, 42D thereof and functions in cooperation with tailgate 20 to fully enclose cargo bed 18 when tonneau cover 42 is located in its fully deployed position.

Figure 10:
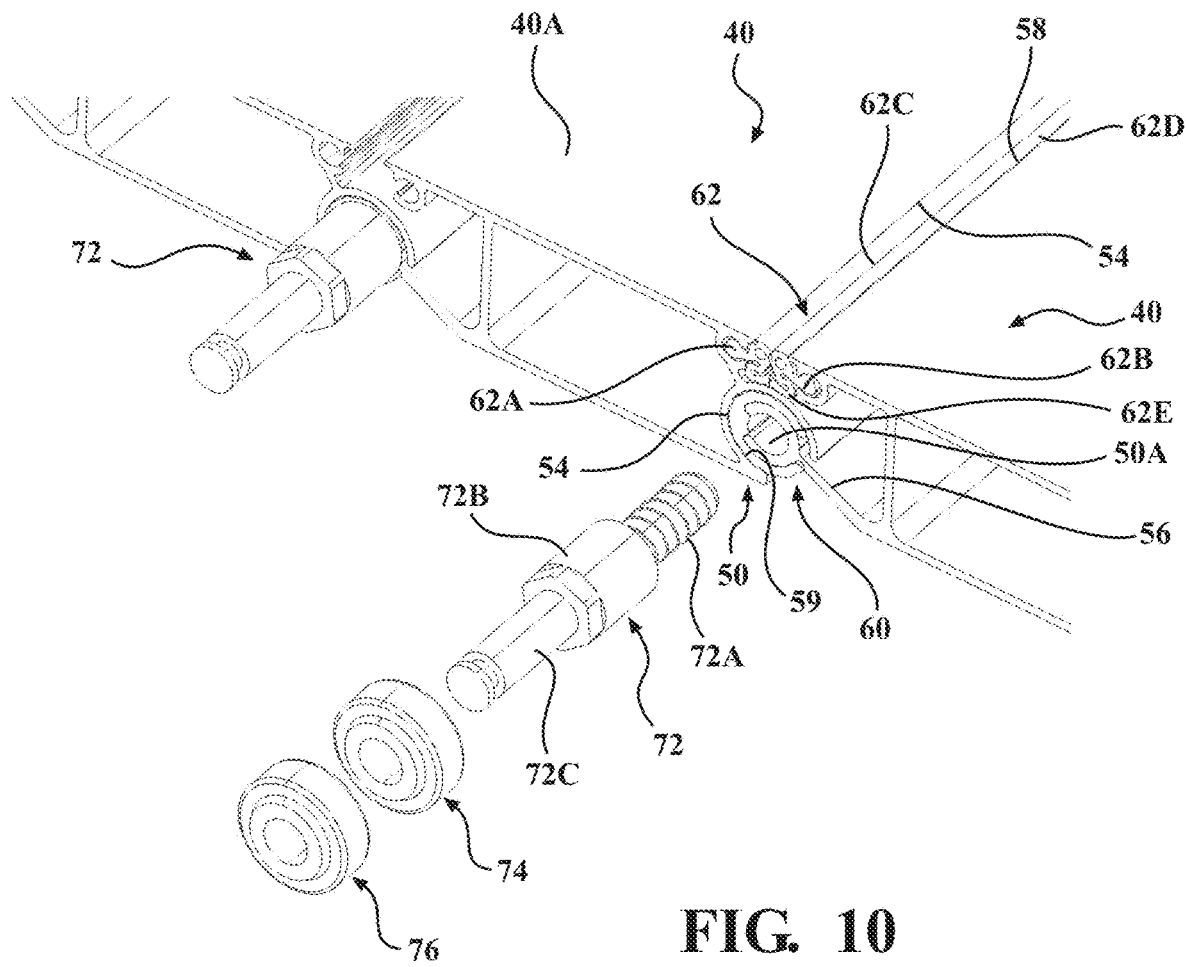
FIGS. 10 and 10A are exploded perspective views showing the dual roller unit in relation to a pair of adjacent slats of the multi-panel tonneau cover, with the adjacent slats interconnected via a hinge unit and sealed via a slat seal unit.
Figure 10A:
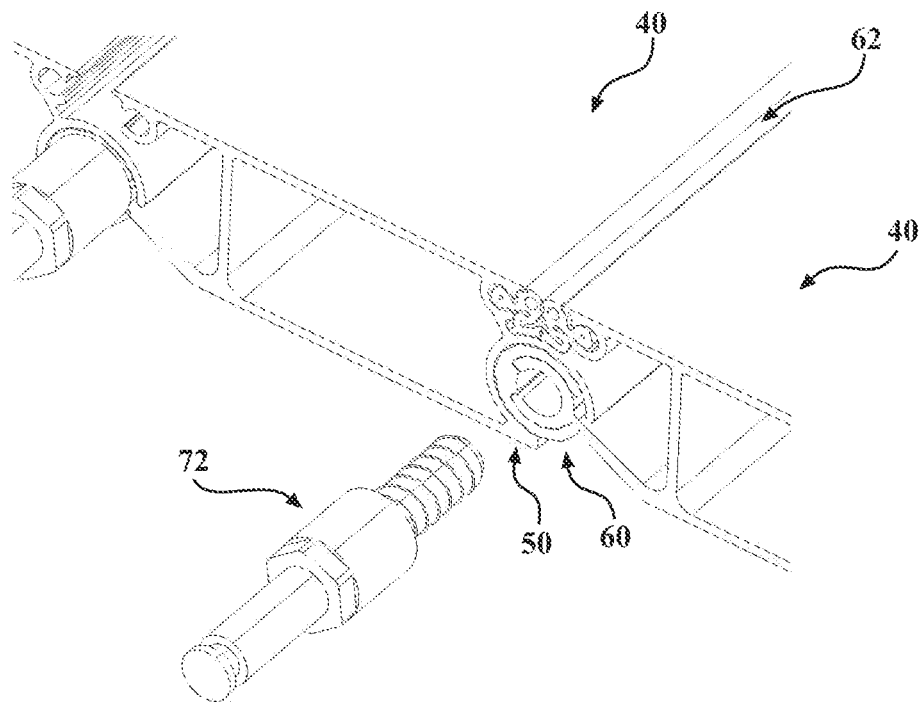
Figure 10B:
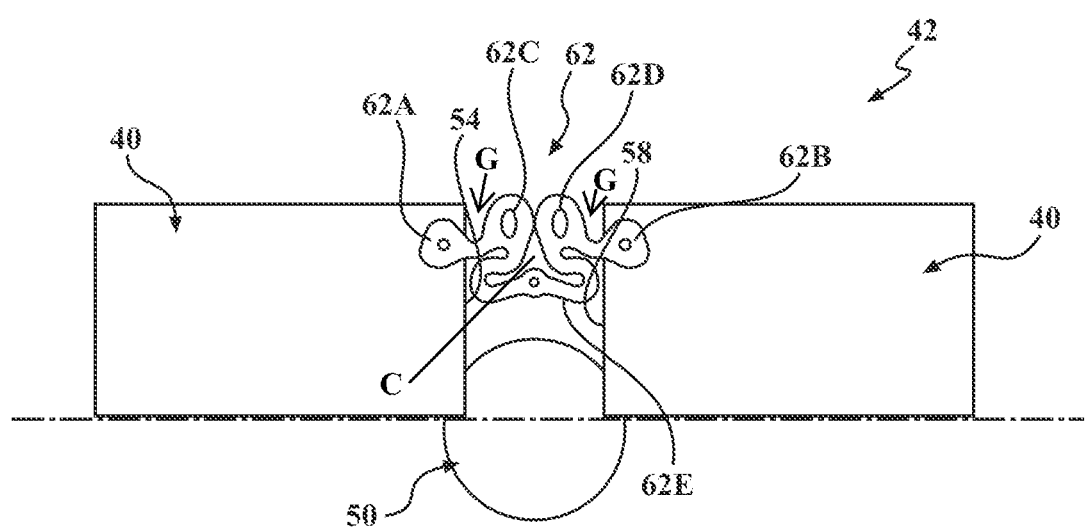
Figure 10C:
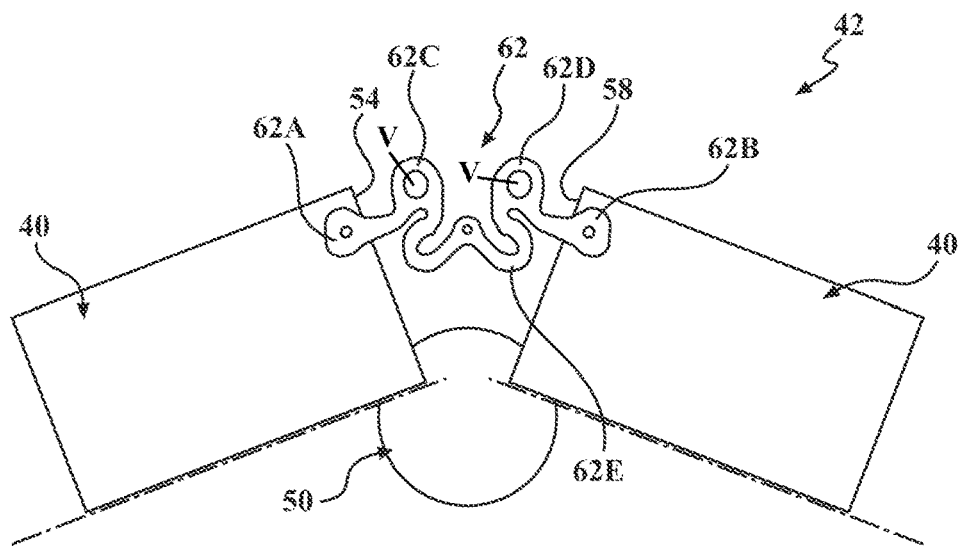
Figure 10D:
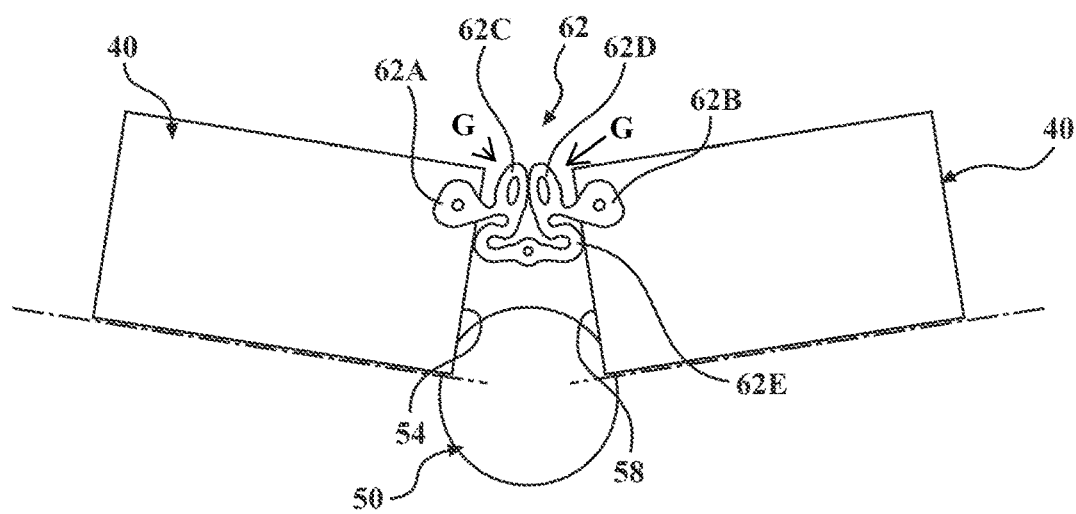
Figure 10E:
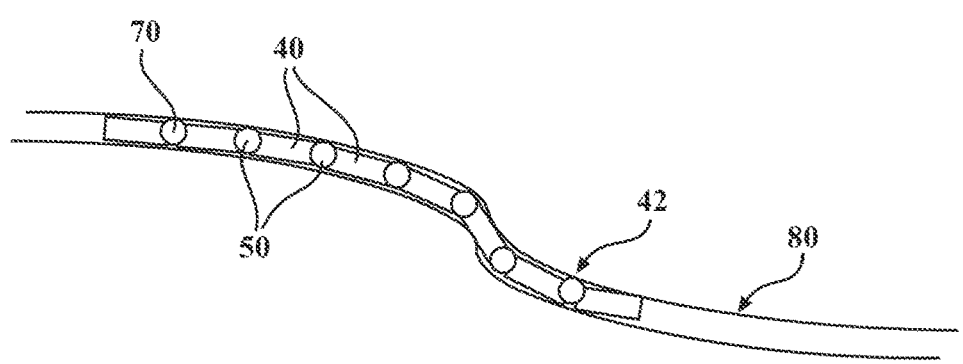

As best seen from FIGS. 10 and 10A, immediately adjacent slats 40 are pivotally interconnected with one another via a hinge unit 50 defined by a first or female hinge flange 52 formed integrally with a front portion 54 of each slat 40 and configured to receive a second or male hinge flange 56 formed integrally with a rear portion 58 of an adjacent slat 40. Both female hinge flange 52 and male hinge flange 56 extend across the entire lateral dimension of slats 40 (i.e. between edge portions 42C and 42D) and define an elongated annular aperture 59 therebetween. Hinge units 50 further include a slat bushing 60 installed in aperture 59 between female hinge flange 52 and male hinge flange 56 and functions to maintain alignment while permitting pivotal movement between the interconnected adjacent slats 40. Slat bushing 60 can be formed of any suitable low friction, bushing grade material, such as a suitable polymeric bushing grade material, by way of example and without limitation, thereby minimizing the amount of play between female hinge flange 52 and male hinge flange 56, thus minimizing noise generation, while allowing low friction pivotal movement therebetween. In addition, a slat seal unit 62 is operably installed between front portion 54 and rear portion 58 of adjacent slats 40. Hinge unit 50 may be configured as a fastener-less hinge comprising interlocking male and female components assembled through a sliding connection. For example hinge unit 50 may be configured as a pin hinge whereby female hinge flange 52 is configured as having a female barrel 51 to slidably receive the male hinge flange 56 configured having a male barrel 53 acting as a pin. Female barrel 51 is shown as having a "C" shaped cylindrical cross section whereby the break in its cylindrical body provides for pivoting of the male hinge flange 56. In order to provide coaxial alignment of the hinge pivot axis with the rotation axis of central aperture 50A of a roller mechanism 66 to be described herein below in more detail below, the male barrel 53 may be provided with a central bore or central aperture 50A for slideably receiving an axle of the roller mechanism 66 for coupling therein. Male barrel 53 is also illustratively shown as having a "C" shaped cylindrical cross section but may be provided as a continuous cylinder. When male barrel 53 is nested within the female barrel, a pivotal connection is formed through geometric interconnection without the need for rivets, bolts or other fastener types. Slat bushing 60 may be provided for take up the clearance between the inner wall of the female barrel and the outer wall of the male barrel and/or assist with the prevention of extraction of the male barrel 53 through the break in the body of the female barrel 51. Slat seal unit 62 is made of a highly elastic, resilient material and is configured to include a first retention segment 62A disposed in a first retainer receptacle formed in front portion 54 of slat 40, a second retention segment 62B disposed in a second retainer receptacle formed in rear portion 58 of an adjacent slat 40, a first sealing segment 62C interconnected to and extending from first retention segment 62A, a second sealing segment 62D interconnected to and extending from second retention segment 62B, and a flexible, looped web segment 62E, provided as a single layer of elastic sheet material, such as rubber, by way of example and without limitation, interconnecting first sealing segment 62C and second sealing segment 62D. First sealing segment 62C and second sealing segment 62D are tubular, having a tubular wall extending lengthwise between the opposite guide track units 80, 82, and function in cooperation with web segment 62E to accommodate misalignment upon inward and outward pivotal movement of adjacent slats 40 about a hinge axis HA defined by hinge units 50, as is clearly shown from the illustrations provided in FIGS. 10B through 10E. As shown in FIGS. 10B, 10C, web segment 62E allows first sealing segment 62C and second sealing segment 62D to move laterally toward and away from one another during retraction and deployment of tonneau cover 42, such as needed to coil (FIG. 10C) tonneau cover 42 into furled relation in storage box 230. First sealing segment 62C and second sealing segment 62D may be urged into contact with one another to seal a cavity C formed above web segment 62E when the adjacent slats 40 are angled straight relative to one another (FIG. 10B), or obtusely angled to one another (FIG. 10D). A gap G may be present between each of the first sealing segment 62C and second sealing segment 62D and the adjacent slat 40 so as not to hinder the adoption of the obtuse angles between slats shown in FIG. 10D. In another possible configuration the gap(s) G may be provided as a central void V with in the first sealing segment 62C and second sealing segment 62D to allow their deformation so as not to hinder the obtuse angle adopted by slats 40 of FIG. 10D.

Figure 8:
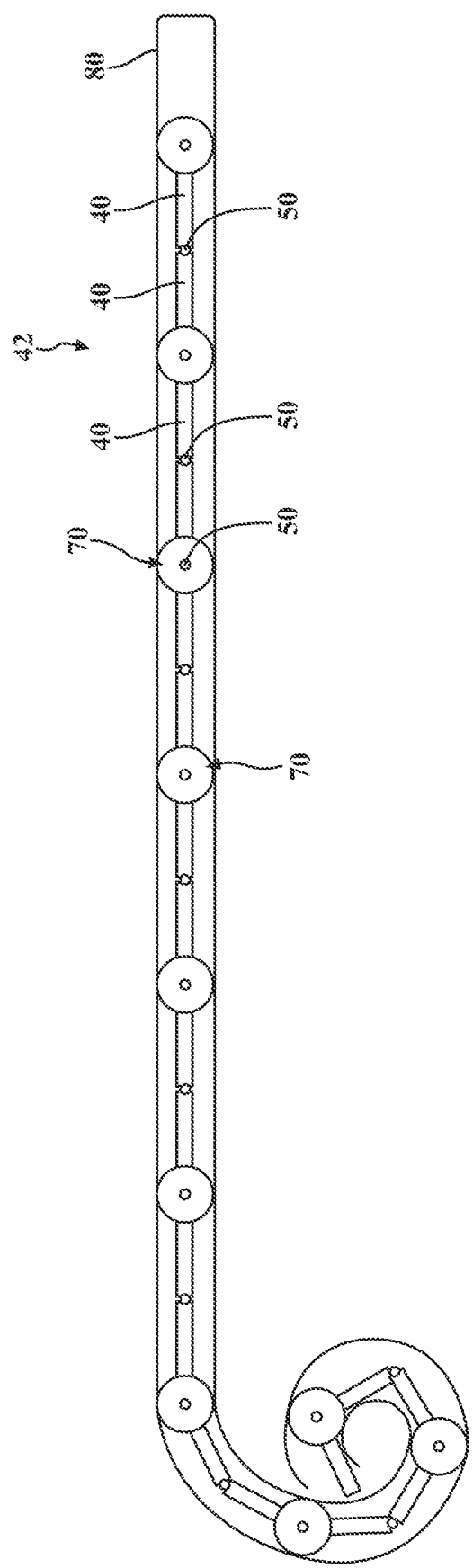
FIG. 8 is a schematic side illustration of the multi-panel tonneau cover equipped with a plurality of dual roller units configured to interact with the guide track units to provide an anti-rattle feature.
Figure 9:
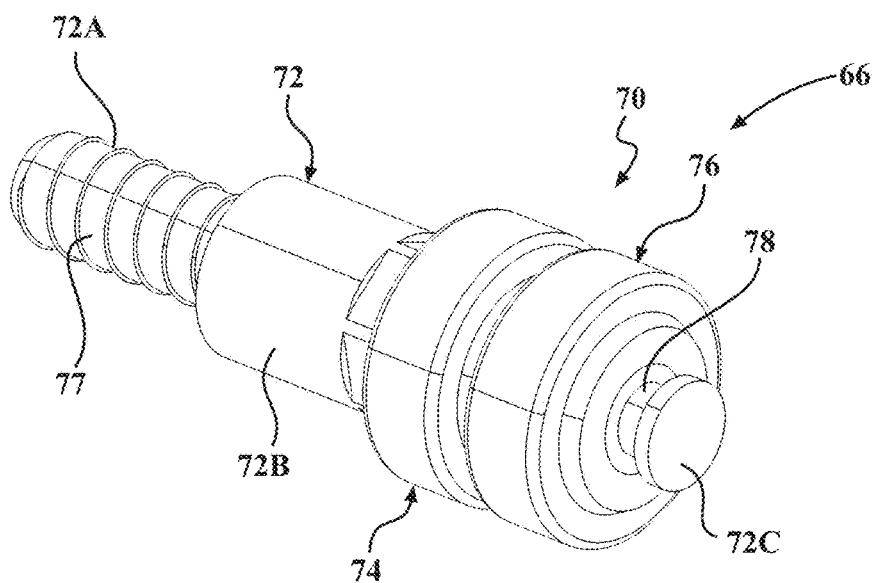
FIG. 9 is a perspective view of one of the dual roller units constructed according to one non-limiting embodiment of the present disclosure.

Retractable tonneau cover 42 is configured to be moveable relative to cargo bed 18 between its fully deployed position (FIG. 1) and its fully retracted position (FIGS. 3-7). To this end, tonneau cover 42 utilizes a roller mechanism 66 and a guide track mechanism 68 as part of closure system 24. Roller mechanism 66 includes a plurality of roller units, shown and referred to hereafter as dual roller units 70, best shown in FIGS. 9 and 10, to generally include an axle 72, wherein axle 72 can be formed by a bolt 72, an inner roller 74 and an outer roller 76. Axle or bolt 72 includes a mounting segment 72A, a spacer segment 72B, and a roller support segment 72C. Mounting segment 72A is illustratively configured to be coupled in a central aperture 50A defined by a tubular cavity (e.g. formed in male barrel 53) extending coaxially along hinge axis HA. Mounting segment 72A may in one possible configuration be formed with anti-extraction features along hinge axis HA, such as radially outwardly extending barbs 77, and is configured to be fixedly installed against removal in a direction along hinge axis HA when installed within a central aperture 50A defined by a tubular cavity extending coaxially along hinge axis HA, wherein tubular cavity is bounded in part by tubular male hinge flange 56 and slat bushing 60. Bards 77 may or may not be configured to prevent rotation of the mounting segment 72. Accordingly, mounting segments 72A may be configured to be fixedly mounted in central apertures 50A of hinge units 50, such that bolts 72 extend coaxially with hinge axis HA. Another type of fitted connection may be a screw connection whereby threads provided on mounting segment 72 engage on threads provided on the inner wall of central apertures 50. In another possible configuration mounting segment 72A may be coupled with central aperture 50A with a fitted connection having a clearance between mounting segment 72A and central aperture 50A. Mounting segment 72A may be provided without any retention features and be configured as a smoother cylinder in one possible configuration. Retention of the mounting segment 72A within central aperture 50A and against withdrawal of the mounting segment 72A in a direction along hinge axis HA from within central aperture 50A may result not from the coupling between the mounting segment 72A and central aperture 50A, such as via a barded or screw connection, but by a blocking configuration acting on axle 72. For example, a blocking configuration may include a stop member acting on axle 72 opposite the coupling connection of the mounting segment 72A and central aperture 50A provided by cable guide unit 150 and/or bridge section 156 and/or a side wall 90a of roller support section 90 for abutment against axle 72 in the hinge axis HA direction. As a result, an imparted rotation of the mounting segment 72A within central aperture 50A during rolling of roller 74, 76 may be facilitated or allowed by the coupling configuration between the axle 72 and the central aperture 50A, for example through the tolerance coupling, without affecting the integrity of the coupling which may occur compared to fitted connections and/or screwed connections whereby the rotation of the axle 72 may cause the screw connection to unscrew and or create friction for other types of fastener connections. Mounting segment 72A is not fastened to the hinge unit 50. Fastenerless connection of the rollers 74 and 76 to the hinge unit 50 may thus provide rapid assembly and a robust coupling through the assembly process involving the insertion of the rollers 74, 76 into the guide track 80. Rollers 74 and 76 are rotatably supported on roller support segment 72C of bolt 72 and retained therein via a snap ring (not shown) mounted in a retention groove 78 (FIG. 9). Roller units 70 are installed in both first and second lateral edge portions 42C, 42D of tonneau cover 42 and extend outwardly therefrom so as to be aligned for rotation about a roller axis RA that is coaxially aligned with the pivot axis HA of hinge units 50. A plurality of roller units 70 are fixedly installed in a first or driver-side guide track unit 80 and a plurality of roller units 70 are fixedly installed in a second or passenger-side guide track unit 82, which together define guide track mechanism 68. Driver-side guide track unit 80 serves a dual function of a track for guiding the plurality of roller units 70 while also providing a conduit for housing and protecting cabling as will be described herein below with reference to cable 151. FIG. 8 illustrates dual roller units 70 operably associated with every other hinge unit 50 and rollingly disposed on guide structures formed within first guide track unit 80. However, the remaining drawings illustrate a more preferred arrangement wherein dual roller units 70 are associated with every hinge unit 50 as an alternative configuration.

Referring now to FIGS. 11-14, a non-limiting configuration for first guide track unit 80 is shown in association with one or more dual roller units 70. Those skilled in the art will understand that the interaction between dual roller units 70 and opposite guide track unit 82 is virtually identical such that the following description is applicable to both sides of guide track mechanism 68 associate with closure system 24. First guide track unit 80 is configured to be installed on, or partially within, a portion of a driver-side panel 18A of cargo bed 18. Likewise, second guide track unit 82 is configured to be installed on, or partially within, a portion of passenger-side panel 18B of cargo bed 18. FIG. 11 shows first guide track unit 80 mounted to side panel 18A via a plurality of fasteners 84 and configured to include a mounting base section 86, a lower track seal retention section 88, a roller support section 90, and an upper track seal retention section 92. Fasteners 84 are shown extending through mounting base section 86. A resilient upper track seal unit 94 is secured to upper track seal retention section 92 and extends generally above an external surface portion of tonneau cover 42 along edge portion 42C. Additionally, a resilient lower track seal unit 96 is secured to lower track seal retention section 88 and extends generally below an internal surface portion of tonneau cover 42 along edge portion 42C. The multi-functional aspects of both upper track seal unit 94 and lower track seal unit 96 define the track sealing arrangement 98 of the present disclosure, which will be detailed in greater specificity hereinafter.

FIG. 12 is provided to illustrate the anti-rattle feature associated with the interaction between dual roller units 70 and guide track units 80, 82. In particular, roller support section 90 of guide track unit 80 is shown to include a first (i.e. upper) roller surface 100 against which inner roller 74 is in rolling contact and a second (i.e., lower) roller surface 102 against which outer roller 76 is in rolling contact. A stepped portion 90A of roller support section 90 provides a clearance gap 104 relative to outer roller 76, such that a portion of the first roller surface 100 extends in overlying, radially spaced relation from the outer roller 76, thereby being out of rolling engagement from the outer roller 76. Meanwhile, second roller surface 102 is shown terminating prior to inner roller 74, thereby being spaced from the inner roller 74 and out of rolling engagement therefrom. Accordingly, first roller surface 100 is only contacted by inner roller 74 for rolling engagement therewith, such that outer roller 76 does not contact first roller surface 100, while second roller surface 102 is only contacted by outer roller 76 for rolling engagement therewith, such that inner roller 74 does not contact second roller surface 102. Inner roller 74 and outer roller 76 therefore may only each in contact with one surface, e.g. one upper surface and one lower surface, along which to role as shown in FIG. 13. According to this arrangement, contact between inner roller 74 and first roller surface 100 limits upward movement of dual roller units 70 while contact between outer roller 76 and second roller surface 102 limits downward movement of dual roller units 70, whereby tonneau cover 42 can be maintained in its fully deployed position without generating undesirable rattling noise, while not inhibiting rotation of the roller unit 70.

Referring now primarily to FIGS. 11 and 13-14, the construction and functional attributes of a resilient, elastomeric upper track seal unit 94 and a resilient, elastomeric lower track seal unit 96 of track sealing arrangement 98 will be detailed. Upper track seal unit 94 extends longitudinally along the entire length of guide track unit 80 and is configured to include a base segment 110, a retention tab 112 extending outwardly from base segment 110 and disposed within a retention chamber 114 of an upper track seal retention section 92, a slat seal lip 116 extending inwardly from base segment 110, and a track seal lip 118 extending downwardly from base segment 110. Retention tab 112 defines a push-in retainer inserted through a slotted aperture 120 in guide track unit 80 and retained in chamber 114, thereby securely fastening upper track seal unit 94 to guide track unit 80. Base segment 110 of upper track seal unit 94 is located above spacer segment 72B of bolt 72. Slat seal lip 116 extends over and resiliently engages an outer surface 40A of slats 40 so as to provide an external sealing function relative to tonneau cover 42 when deployed to its fully closed position. Track seal lip 118 is shown configured to engage and ride over spacer segment 72B of bolt 72.

With continued reference to FIGS. 11 and 13-14, lower track seal unit 96 is also shown to extend longitudinally along the entire length of guide track unit 80 and is disposed partially within a retention chamber 128 associated with lower track seal retention section 88. Lower track seal unit 96 is generally configured to include a channel-shape retention segment 130, a support segment 132 extending from retention segment 130, a locator flange 134 extending downwardly in cantilevered relation from support segment 132, and a cantilevered flapper seal lip 136 extending upwardly in cantilevered relation from support segment 132, such that locator flange 134 and flapper seal lip 136 extend in opposite directions away from support segment 132. Retention segment 130 is located within a similarly-shaped portion of retention chamber 128 associated with lower track retention section 88. A retention feature, configured as a push-in tab 138, extends downwardly from retention segment 130 and is inserted into a slotted aperture formed in guide track unit 80, thereby securely mounting lower track seal unit 96 thereto. Support segment 132 of lower track seal unit 96 is located above retention segment 130 and is interconnected thereto via a beam segment 140. Locator flange 134 extends through an open portion of retention chamber 128 in lower track retention section 88 of guide track unit 80 and has a terminal tip portion 142 engaging an outer wall surface 80A within internal storage space 30 of cargo bed 18. Flapper seal lip 136 is normally located in a relaxed/sealing position with its tip end 144 normally biased into sealed engagement against the track seal lip 118 of upper track seal 94.

As best shown in FIG. 13, when tonneau cover 42 is retracted, the interaction between upper track seal unit 94 and lower track seal unit 96 functions to seal guide track unit 80 against water and dirt being introduced from within cargo bed 18 so as to maintain rollers 74, 76 in a sealed environment. In contrast, movement of tonneau cover 42 toward its fully deployed positions causes spacer segment 72B of bolts 72 to deflect tip end 144 of flapper seal lip 136 (as shown in phantom) to a biased/unsealed position displaced from engagement with tip portion 118 of upper track seal unit 94. In this deflected position, flapper seal lip 136 engages an underside portion of spacer segment 72B of roller bolts 72. Thus, portions of both upper track seal unit 94 and lower track seal unit 96 are resiliently biased into engagement with roller unit bolts 72 to again establish a sealed relationship of roller units 70 relative to water and dirt introduced from within cargo bed 18. FIG. 14 also illustrates a cable guide unit 150 supporting a cable 151 associated with a cable management arrangement 152 also associated with power-operated closure system 24. Cable guide unit 150 includes a pair of shaft support sections 154 partially surrounding roller support segment 72C of bolts 72 and which are interconnected via a bridge section 156. A resilient wiper flange 158 is formed outboard of each roller surface 102 of guide track unit 80 and acts as a wiper to remove accumulated dirt/dust/water therefrom. A plurality of cable guide units 150 are associated with tonneau cover 42, as is shown in the drawings.

Referring now to FIGS. 15-18 of the drawings, closure panel 26 is shown to include a linkage mechanism, such as a chain linkage mechanism 160, configured to interconnect tonneau cover 42 to a pair of powered actuators, such as electric motors 162 (FIG. 18), associated with first power-operated drive unit 25. FIG. 15 is a top view of chain linkage mechanism 160 showing a first or driver-side chain link unit 164, a second or passenger-side chain link unit 166, and a plurality of lateral cross members, such as tubular rails 168, interconnecting first chain link unit 164 and second chain link unit 166 to provide additional stability therebetween. Chain link mechanism 160 functions to extend deployment of tonneau cover 42 without need of the additional weight associated with slats 40. Each chain link unit 164, 166 has a first portion, also referred to as lead chain end section 164A, 166A, pivotably secured to trailing end section 42B of tonneau cover 42 and a second portion, also referred to as trailing chain end section 164B, 166B, operably connected to a furling mechanism 242 and electric motors 162 of first power-operated drive unit 25, as will be details with greater specificity hereinafter. Chain link unit 164, 166 may also be similarly configured as a pin hinge as described herein above having nested barrels and a central aperture for facilitating coaxial alignment of the hinge pivot axis with the roller axis through insertion of an axle or bolt 72 into a central aperture 50A, as will be described in more detail below.

Referring primarily to FIGS. 16A and 16B, a non-limiting embodiment of the construction for first chain link unit 164 is shown. Those skilled in the art will appreciate that second chain link unit 166 is substantially similar, if not identical, to first chain link unit 164 such that specific description thereof is not required. First chain link unit 164 is shown to include a plurality of links 170 that are pivotally interconnected via a link hinge unit 172. Link hinge unit 172 is similar to that of slat hinge unit 50, in terms of construct and function, and includes a first or female hinge flange 174 formed integrally on a first end of link 172 and which is configured to receive a second or male hinge flange 176 formed integrally on an opposite end of an adjacent link 172. An aperture 178 is formed between male hinge flange 176 and female hinge flange 174 and is sized and configured to accept installation of a tubular link bushing 180 therein. A dual roller unit 70 is installed in a first end of link bushing 180 so as to be coaxially aligned with pivotal link hinge unit 172. In addition, a hull pin 182 is installed within a cylindrical aperture formed within a second end of link bushing 180. Hull pin 182 includes a support segment 183 configured to extend across the entire length of link 172 upon installation in link bushing 180, and a connector plug segment 184 configured to be secured to an end of cross rail 168. Thus, dual roller units 70 and cross rails 168 of chain link unit 164 are commonly aligned coaxially with link hinge unit 172. FIGS. 16C-16E show a slightly revised version of chain link unit 164' which combines bushing part 180 and hull part 182 in to a common component, referred to as hinge tube 182'. Dual roller unit 70' now includes a fixation shaft section 72' configured to extend through hinge tube 182' with its terminal end portion 190 secured to a snap-in retainer 192 formed in connector plug segment 184'. Note the connection of cable guide units 150 to dual roller units 70'.

FIG. 17 is a pictorial view of chain link unit 164 (or chain link unit 166) interacting with guide track unit 80 so as to illustrate the coaxial alignment of hinge unit 170 with roller unit 70. FIG. 18 is a top pictorial view of chain linkage mechanism 160 in relation to laterally-spaced electric motors 162 of first power-operated drive unit 25 showing chain link units 164 and 166. A motor-driven cog unit 200 is utilized to drive chain link units 164, 166 (via engagement with roller shafts 72) so as to drive couple chain linkage mechanism 160 to first power-operated drive unit 25 for controlling movement of tonneau cover 42 between its retracted and deployed positions.

FIGS. 19-22 illustrate a deflector cam 210 associated with coupler 44 along leading segment 42A of tonneau cover 42 arranged at drive-side edge section 42C. While not shown, a similar deflector cam is associate with end coupler 44 along its opposite lateral edge (i.e. the passenger side). Deflector cam 210 is configured to engage and deflect flapper lip 136 of lower track seal unit 96 as tonneau cover 42 moves toward its deployed position. FIG. 20 provides a schematic illustration of the resilient deflection of lower track seal unit 96 upon deployment of tonneau cover 42 caused by deflector cam 210 engaging and forcibly deflecting flapper lip 136. FIG. 21 illustrates upper track seal unit 94 sealed against slats 40 (FIG. 22) of closure panel 42 while lower track seal unit 96 is shown located in its unbiased/sealed position with flapper lip 136 engaging shaft 72 of roller units 70 once deflector cam 210 has moved out of engagement. The phantom line (see arrow 211) shows flapper lip 136 deflected towards its biased/unsealed position due to engagement with deflector cam 210. FIG. 22 illustrates deflector cam 210 acting to deflect flapper lip 136 of lower track seal unit 96. FIG. 23 illustrates a water intrusion or management arrangement configured such that the sealing arrangement, provided by the interaction of track seal units 94, 96, cooperates to establish a water channel within guide track unit 80 that is isolated from roller units 70 so as to provide a discharge pathway for water/dirt that does not impact operation of roller units 70. The water channel pathway is identified by arrows 212 in FIG. 23 and terminates with a runoff point located to collect and discharge water away from roller units 70.

With particular attention now drawn to FIGS. 24-27, the construction and functional operation of a non-limiting embodiment of an applique cover assembly 220 will now be described. Applique cover 28 is adapted to be mounted to a support plate 222 interconnected to second power-operated drive unit 29 via a linkage assembly 226 and a pivot hinge unit 228. Second power-operated drive unit 29 is configured to include a linear actuator 29 that is operably in a first state to locate applique cover 28 in its closed position (FIGS. 1, 2, 4, 6, and 24-27) and in a second state to locate applique cover 28 in its opened position (FIGS. 5 and 7). In its opened position, an over-center locking mechanism 230 functions to hold support plate 222 is its raised position.

FIGS. 28 and 29 illustrate first power-operated drive unit 25 of closure system 24 to include a structural storage box, also referred to as storage frame 230, having a pair of end plates 232, 234 interconnected by a plurality of upper and lower crossbeams 236, 238. End plate 232 is aligned with and operably coupled with driver-side panel 18A of cargo bed 18 and end plate 234 is aligned with and operably coupled with passenger-side panel 18B of cargo bed 18. A first electric motor 162A is mounted to end plate 232 and drives a first cog-type geartrain 240A of cog unit 200 that is operable to engage roller bolts 72 of the dual roller units 70, 70' associate with both tonneau cover 42 and first chain link unit 164 and along driver-side 42C. Likewise, a second electric motor 162B is mounted to end plate 234 and drives a second cog-type geartrain 240B that is operable to engage roller bolts 72 of the dual roller units 70, 70' associated with both tonneau cover 42 and second chain link unit 166 along the passenger-side 42D. First end plate 232 further includes a circuitous (spiral) furling channel 242A of furling mechanism 242 and second end plate 234 includes a circuitous (spiral) furling channel 242B of furling mechanism 242 that is a mirror image of furling channel 242A.

With particular attention to FIGS. 30 through 34, further structural and functional aspects of first power-operated drive unit 25 are shown. A cable coupling unit 250 is nested within a first end 252A of furling channel 242A and a first end portion of cable 151 is guided therethrough with its terminal end attached to end plate 234 (FIG. 34). As best seen in FIGS. 31 and 34, furling channels 242A, 242B are oriented such that "winding" of chain link units 164, 166, and subsequently tonneau cover 42 between first ends 252A, 252B and second ends 254A, 254B of furling channels 242A, 242B, causes movement of closure panel 26 between its fully retracted and fully deployed positions. As is also best seen from FIGS. 31 and 33, cog-type geartrain 240A includes a cog wheel 260 rotatably driven by electric motor 162A of power-operated drive unit 25 and having cog teeth 262 sized to receive shaft portions of roller bolts 72 therebetween. Accordingly, rotation of cog wheel 260 in a first direction (i.e. clockwise in FIG. 31) functions to drive roller bolts (axles) 72 in a first direction, which in turn causes tonneau cover 42 to be moved toward, and ultimately to its retracted position. In contrast, rotation of cog wheel 260 in the opposite second direction (i.e. counterclockwise in FIG. 31) functions to drive shaft portions of roller bolts 72 in an opposite second direction, which in turn causes tonneau cover 42 to be moved toward, and ultimately to its deployed position.

As noted, one end of cable 151 is connected to end plate 234 of first power-operated drive unit 25 (FIG. 34). The opposite end of cable 151 is connected to coupling unit 44 at the forward end of tonneau cover 42 (FIG. 35). As noted, cable 151 is supported in a plurality of cable guide units 150 associated with roller units 70, 70' in chain link unit 164. Furling channel 242A is configured to minimize the additional length of cable 151, referred to as "slack" ("S" in FIG. 32A), required during movement of tonneau cover 42 between its retracted and deployed positions. This optimized furling configuration therefor accommodates cable slack without need for special features. FIGS. 33 and 34 illustrate connection of cable 151 to a cable connector unit 250. A textile guide rope 253, by way of example and without limitation, is also shown connected to cable connector unit 250 and is attached via a guide spring to cable 151.

It is contemplated that vehicle 10 would be equipped with a control system for controlling coordinated movement of tonneau cover 42 between its retracted and deployed positions with movement of applique cover 28 between its closed and opened positions. Thus, a controller is provided for controlling and coordinating operation of electric motors 162A, 162B of first power-operated drive unit 25 and second power-operated drive unit (linear actuator) 29 for applique cover assembly 220 to facilitate such coordinated movement. An operator input signal, delivered to controller via actuation of a vehicle-mounted switch or a remote key fob, is used to control actuation of all power-operated devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure system for a motor vehicle having a cargo bed, comprising:
   a closure panel extending along opposite side edge portions between opposite end portions, said closure panel being moveable between a deployed position and a retracted position and having a plurality of slats, with adjacent pairs of said plurality of slats being pivotably connected to one another by at least one hinge unit to facilitate relative pivotal movement between said adjacent pairs of said plurality of slats about a hinge axis;
   a guide track mechanism including a driver-side guide track unit, configured to be mounted to the cargo bed and to extend adjacent one of said opposite side edge portions, and a passenger-side guide track unit, configured to be mounted to said cargo bed and to extend adjacent the other of said opposite side edge portions;
   a plurality of roller units, each of said roller units having an axle, at least one roller supported by a roller support segment of said axle for rolling movement about a roller axis along said driver-side guide track unit and along said passenger-side guide track unit, and a mounting segment coupled to said at least one hinge unit, wherein said hinge axis and said roller axis are coaxially aligned; and
   wherein the at least one roller include a first roller and a second roller, wherein said driver-side guide track unit and said passenger-side guide track unit each include a first roller surface and a second roller surface, wherein said first roller is configured for rolling engagement with said first roller surface and said second roller is configured for rolling engagement with said second roller surface.

2. The closure system of claim 1, wherein said first roller is spaced from said second roller surface and said second roller is spaced from said first roller surface.

3. The closure system of claim 2, wherein said first roller surface has a stepped portion forming a gap between a portion of said first roller surface overlying said second roller.

4. The closure system of claim 3, wherein said first roller surface extends solely along one side of said roller axis and said second roller surface extends solely along a diametrically opposite side of said roller axis from said first roller surface.

5. The closure system of claim 1, further including a plurality of slat seal units, separate ones of said slat seal units extending between the adjacent pairs of said plurality of slats to provide a continuous sealed interface between the adjacent pairs of said plurality slats to prevent the ingress of fluid into the cargo bed when the closure panel is in the deployed position.

6. The closure system of claim 5, wherein each of the plurality of slat seal units have a first retention segment configured for attachment to one of the adjacent pairs of said plurality slats and a second retention segment configured for attachment to the other of the adjacent pairs of said plurality slats, a first sealing segment connected to the first retention segment, a second sealing segment connected to the second retention segment, and a flexible, looped web segment extending between the first sealing segment and the second sealing segment, wherein the web segment allows the first sealing segment and the second sealing segment to move laterally toward and away from one another during movement of the cover panel between the deployed and retracted positions.

7. The closure system of claim 6, wherein the first sealing segment and the second sealing segment have a tubular wall extending lengthwise between the opposite driver-side and passenger-side guide track units.

8. The closure system of claim 1, further including a track sealing arrangement arranged to provide sealed engagement with the driver-side and passenger-side guide track units to seal driver-side and passenger-side guide track units to maintain first and second rollers in a sealed environment.

9. The closure system of claim 8, wherein the track sealing arrangement includes a pair of upper track seal units that extend longitudinally along the length of the driver-side and passenger-side guide track units, and a pair of lower track seal units that extend longitudinally along the length of the driver-side and passenger-side guide track units, each of the upper track seal units having a slat seal lip and a track seal lip, the slat seal lip extending over and resiliently engaging an outer surface of the plurality of slats to provide an external sealing function relative to the cover panel when the cover panel is in the deployed position, each of the lower track seal units having a flapper seal lip including a tip end biased into sealed engagement against the track seal lip of the upper track seal units.

10. The closure system of claim 9, wherein the track seal lip is configured to engage and ride over of the axles of the plurality of roller units.

11. The closure system of claim 1, wherein the at least one hinge unit comprises an aperture, wherein the mounting segment is coupled to said at least one hinge unit within the aperture using a tolerance connection.

12. A closure system for a motor vehicle having a cargo bed, comprising:
a closure panel extending along opposite side edge portions between opposite end portions, said closure panel being moveable between a deployed position and a retracted position and having a plurality of slats, with adjacent pairs of said plurality of slats being pivotably connected to one another by at least one hinge unit to facilitate relative pivotal movement between said adjacent pairs of said plurality of slats about a hinge axis;
a guide track mechanism including a driver-side guide track unit, configured to be mounted to the cargo bed and to extend adjacent one of said opposite side edge portions, and a passenger-side guide track unit, configured to be mounted to said cargo bed and to extend adjacent the other of said opposite side edge portions;
a plurality of roller units, each of said roller units having an axle, at least one roller supported by a roller support segment of said axle for rolling movement about a roller axis along said driver-side guide track unit and along said passenger-side guide track unit, and a mounting segment coupled to said at least one hinge unit, wherein said hinge axis and said roller axis are coaxially aligned;
a first power-operated drive unit and a storage box including a furling mechanism configured to be mounted in the cargo bed;
a chain linkage mechanism having a first portion connected to the closure panel and a second portion connected to the furling mechanism; and
a control system for controlling actuation of the first power-operated drive unit to cause movement of the closure panel between the retracted position stored within the furling mechanism in the storage box and the deployed position enclosing the cargo bed.

13. The closure system of claim 12, wherein the furling mechanism includes a circuitous furling channel formed in an end plate of the storage box and which is adapted to receive the chain linkage mechanism and the closure panel therein upon movement of the closure panel to its retracted position.

14. The closure system of claim 13, further including a cable management arrangement including a cable connecting the closure panel and the chain linkage arrangement to the furling channel and cable guide units connected to adjacent pairs of said axles of said roller units.

15. The closure system of claim 12, further including an applique cover configured to be mounted to the cargo bed above the storage box and above a portion of the closure panel for movement between a closed position and an opened position.

16. The closure system of claim 15, further including:
a second power-operated drive unit interconnected to the applique cover, wherein the control system controls actuation of the first power-operated drive unit and the second power-operated drive unit to coordinate movement of the closure panel between its retracted and deployed positions and movement of the applique cover between its opened and closed positions.

17. The closure system of claim 16, wherein the first power-operated drive unit and the second power-operated drive unit are mounted in the storage box.

18. The closure system of claim 12, wherein the first power-operated drive unit includes a geartrain configured to drive a cog wheel in opposite first and second directions of rotation, said cog wheel having cog teeth sized to receive the axle of the roller units therebetween, wherein rotation of cog wheel in the first direction drives roller units in a first direction, which in turn causes closure panel to be moved toward the retracted position, and wherein rotation of cog wheel in the second direction drives roller units in a second direction, which in turn causes closure panel to be moved toward the deployed position.

19. A closure system for a motor vehicle having a cargo bed, comprising:
a closure panel extending along opposite side edges portions between opposite end portions, said closure panel being moveable between a deployed position and a retracted position and having a plurality of slats, with adjacent pairs of said plurality of slats being pivotably connected to one another by at least one hinge unit to facilitate relative pivotal movement between said adjacent pairs of said plurality of slats about a hinge axis;
a guide track mechanism including a driver-side guide track unit, configured to be mounted to the cargo bed and to extend adjacent one of said opposite side edge portions, and a passenger-side guide track unit, configured to be mounted to said cargo bed and to extend adjacent the other of said opposite side edge portions;
a plurality of roller units, each of said roller units having an axle, at least one roller supported by a roller support segment of said axle for rolling movement about a roller axis along said driver-side guide track unit and along said passenger-side guide track unit, and a mounting segment coupled to said at least one hinge unit, wherein said hinge axis and said roller axis are coaxially aligned;
wherein the at least one roller includes a first roller and a second roller, wherein said driver-side guide track unit and said passenger-side guide track unit each include a first roller surface and a second roller surface, wherein said first roller is configured for rolling engagement with said first roller surface and said second roller is configured for rolling engagement with said second roller surface;
a first power-operated drive unit and a storage box including a furling mechanism configured to be mounted in the cargo bed;

a chain linkage mechanism having a first portion connected to the closure panel and a second portion connected to the furling mechanism; and a control system for controlling actuation of the first power-operated drive unit to cause movement of the closure panel between the retracted position stored within the furling mechanism in the storage box and the deployed position enclosing the cargo bed.

20. The closure system of claim 19, wherein said first roller surface has a stepped portion forming a gap between a portion of said first roller surface overlying said second roller.

\* \* \* \* \*